(12) United States Patent
Araki et al.

(10) Patent No.: US 10,970,916 B2
(45) Date of Patent: Apr. 6, 2021

(54) IMAGE PROCESSING APPARATUS AND IMAGE PROCESSING METHOD

(71) Applicant: SONY CORPORATION, Tokyo (JP)

(72) Inventors: Yuichi Araki, Tokyo (JP); Junichi Tanaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/338,903

(22) PCT Filed: Oct. 5, 2017

(86) PCT No.: PCT/JP2017/036344
§ 371 (c)(1),
(2) Date: Apr. 2, 2019

(87) PCT Pub. No.: WO2018/074252
PCT Pub. Date: Apr. 26, 2018

(65) Prior Publication Data
US 2020/0051323 A1    Feb. 13, 2020

(30) Foreign Application Priority Data
Oct. 19, 2016 (JP) .............................. JP2016-204908

(51) Int. Cl.
*G06T 15/20* (2011.01)
(52) U.S. Cl.
CPC ................................. *G06T 15/205* (2013.01)
(58) Field of Classification Search
CPC ...................................................... G06T 15/205
See application file for complete search history.

(56) References Cited

U.S. PATENT DOCUMENTS

2003/0012424 A1* 1/2003 Franich ............... G01B 11/245
382/154
2005/0286085 A1* 12/2005 Lee ......................... H04N 1/58
358/3.26

(Continued)

FOREIGN PATENT DOCUMENTS

JP    2000-146546 A    5/2000
JP    2014-235634 A    12/2014

OTHER PUBLICATIONS

K. Ramnath, S. N. Sinha, R. Szeliski and E. Hsiao, "Car make and model recognition using 3D curve alignment," IEEE Winter Conference on Applications of Computer Vision, Steamboat Springs, CO, 2014, pp. 285-292, doi: 10.1109/WACV.2014.6836087. (Year: 2014).*

(Continued)

*Primary Examiner* — Grace Q Li
(74) *Attorney, Agent, or Firm* — Chip Law Group

(57) ABSTRACT

The present disclosure relates to an image processing apparatus and an image processing method that enable generation of only a 3D model of a foreground. A reconstruction unit generates a 3D model of the foreground, on the basis of depth images of a plurality of viewpoints and foreground images of the plurality of viewpoints. The present disclosure can be applied to a decoding apparatus or the like that decodes an encoded stream of depth-related images and color images of a 3D model of a plurality of viewpoints, and generates a 3D model of the foreground on the basis of the resultant depth-related images and color images, and virtual viewpoint information including internal parameters and external parameters for virtual cameras of the respective viewpoints, for example.

12 Claims, 24 Drawing Sheets

(56) References Cited

U.S. PATENT DOCUMENTS

| | | | | |
|---|---|---|---|---|
| 2012/0050478 A1* | 3/2012 | Karaoguz | ............ | H04N 13/111 |
| | | | | 348/46 |
| 2013/0315473 A1* | 11/2013 | Takahashi | .......... | G06K 9/00201 |
| | | | | 382/154 |
| 2015/0043635 A1* | 2/2015 | Jung | ...................... | H04N 19/52 |
| | | | | 375/240.12 |
| 2015/0269740 A1* | 9/2015 | Mazurenko | ............... | G06T 7/11 |
| | | | | 382/173 |

OTHER PUBLICATIONS

International Search Report and Written Opinion of PCT Application No. PCT/JP2017/036344, dated Jan. 9, 2018, 10 pages of ISRWO.
Hisatomi, et al., "Dynamic 3D Models Generated From Multiple Video", NHK STRL R& D, No. 118, 2009, pp. 30-41.
Moezzi, et al., "Virtual View Generation for 3D Digital Video", 1997 IEEE, Jan.-Mar. 1997, pp. 18-26.
Hisatomi, et al., "Dynamic 3D Models Generated From Multiple Video", NHK No. 118, 2009, pp. 30-41. (English Abstract only).
Hisatomi, et al., "Dynamic 3D models generated from multiple video", NHK, R&D, No. 118, 2009, 16 pages. (English Abstract Only).
Moezzi, et al., "Virtual view generation for 3D digital video", IEEE MultiMedia, vol. 4, Issue 1, Jan.-Mar. 1997, pp. 18-26.

\* cited by examiner

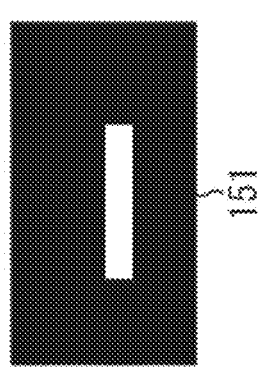
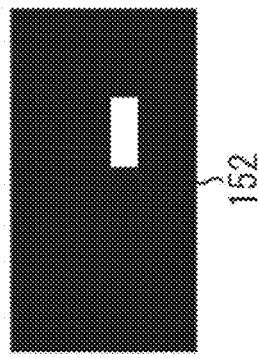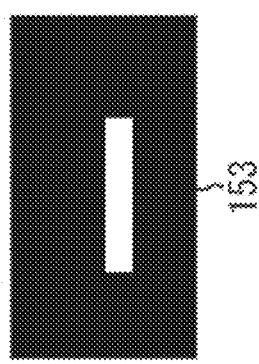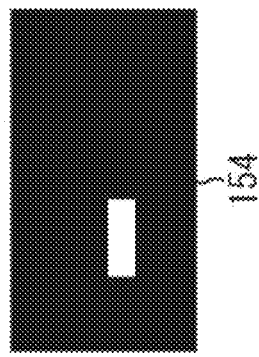

IMAGE PROCESSING APPARATUS AND IMAGE PROCESSING METHOD

CROSS REFERENCE TO RELATED APPLICATIONS

This application is a U.S. National Phase of International Patent Application No. PCT/JP2017/036344 filed on Oct. 5, 2017, which claims priority benefit of Japanese Patent Application No. JP 2016-204908 filed in the Japan Patent Office on Oct. 19, 2016. Each of the above-referenced applications is hereby incorporated herein by reference in its entirety.

TECHNICAL FIELD

The present disclosure relates to an image processing apparatus and an image processing method, and more particularly, to an image processing apparatus and an image processing method that enable generation of only a 3D model of a foreground.

BACKGROUND ART

There is a technique for generating a 3D model of an object from color images and depth images captured by a plurality of cameras (see Non-Patent Document 1, for example).

CITATION LIST

Non-Patent Document

Non-Patent Document 1: Saied Moezzi, Li-Cheng Tai, and Philippe Gerard, "Virtual View Generation for 3D Digital Video", University of California, San Diego

SUMMARY OF THE INVENTION

Problems to be Solved by the Invention

However, any method has not been devised to generate only a 3D model of a foreground.

The present disclosure is made in view of such circumstances, and is to enable generation of only a 3D model of the foreground.

Solutions to Problems

An image processing apparatus of a first aspect of the present disclosure is an image processing apparatus that includes a 3D model generation unit that generates a 3D model of the foreground, on the basis of depth images of a plurality of viewpoints and foreground images of the plurality of viewpoints.

An image processing method of the first aspect of the present disclosure is compatible with the image processing apparatus of the first aspect of the present disclosure.

In the first aspect of the present disclosure, a 3D model of the foreground is generated, on the basis of depth images of a plurality of viewpoints and the foreground images of the plurality of viewpoints.

An image processing apparatus of a second aspect of the present disclosure is an image processing apparatus that includes a transmission unit that transmits depth images of a plurality of viewpoints and foreground information about the foreground of the plurality of viewpoints.

An image processing method of the second aspect of the present disclosure is compatible with the image processing apparatus of the second aspect of the present disclosure.

In the second aspect of the present disclosure, depth images of a plurality of viewpoints and foreground information about the foreground of the plurality of viewpoints are transmitted.

An image processing apparatus of a third aspect of the present disclosure is an image processing apparatus that includes a 3D model generation unit that generates a 3D model of the foreground, on the basis of foreground depth images of a plurality of viewpoints.

An image processing method of the third aspect of the present disclosure is compatible with the image processing apparatus of the third aspect of the present disclosure.

In the third aspect of the present disclosure, a 3D model of the foreground is generated, on the basis of foreground depth images of a plurality of viewpoints.

Note that the image processing apparatuses of the first through third aspects can also be formed by a computer executing a program.

Further, to obtain the image processing apparatuses of the first through third aspects, the program to be executed by the computer may be transmitted and provided via a transmission medium, or the program recorded on a recording medium may be provided.

Effects of the Invention

According to the first and third aspects of the present disclosure, only a 3D model of a foreground can be generated.

Further, according to the second aspect of the present disclosure, it is possible to transmit information that enables generation of only a 3D model of a foreground.

Note that effects of the present technology are not limited to the effects described above, and may include any of the effects described in the present disclosure.

BRIEF DESCRIPTION OF DRAWINGS

FIGS. 6A, 6B, 6C, and 6D are diagrams for explaining a method of generating a 3D model of a foreground with the reconstruction unit shown in FIG. 4.

MODES FOR CARRYING OUT THE INVENTION

The following is a description of modes (hereinafter referred to as embodiments) for carrying out the present disclosure. Note that explanation will be made in the following order.

Figure 23:
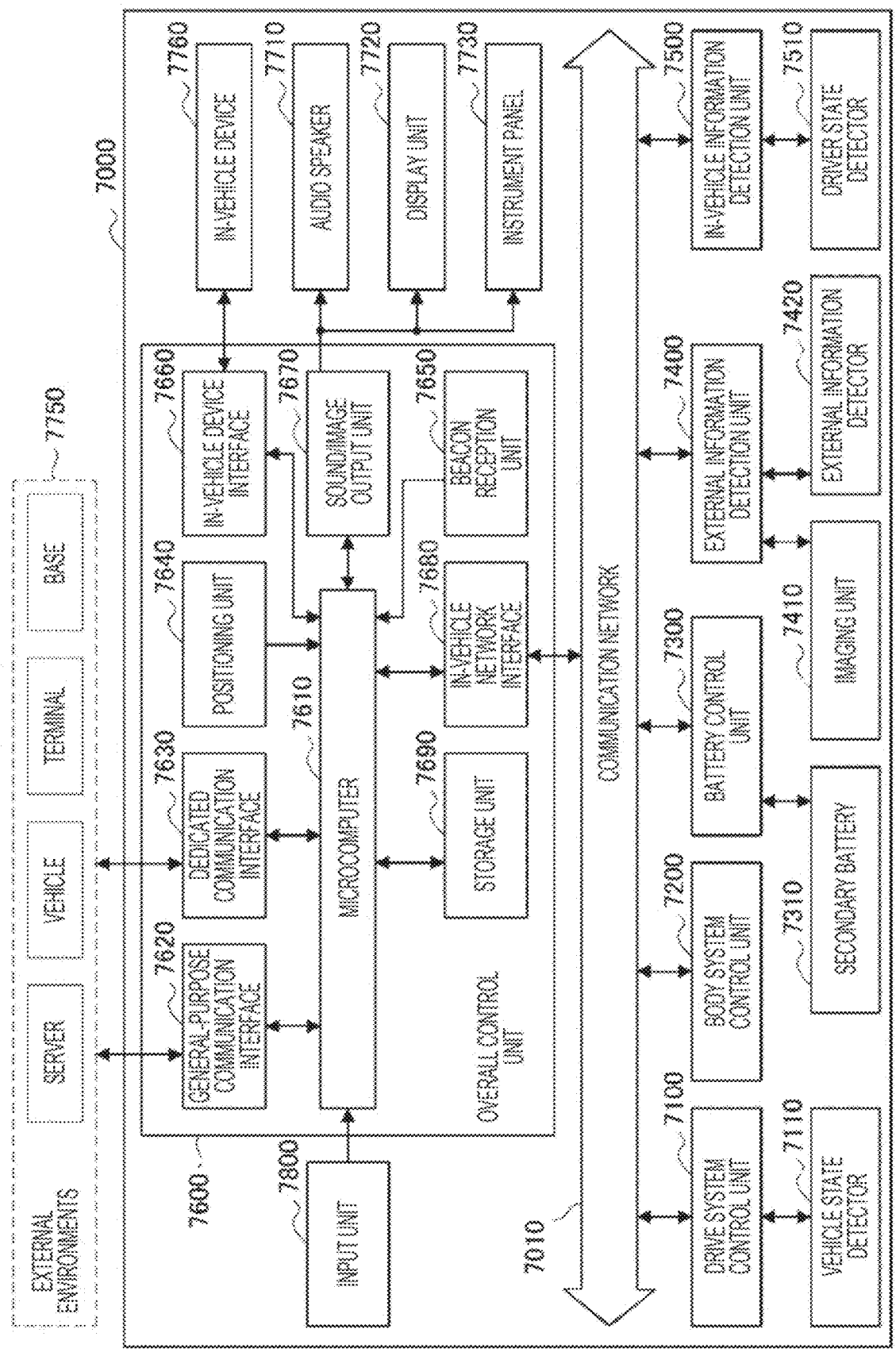
FIG. 23 is a block diagram schematically showing an example configuration of a vehicle control system.
Figure 24:
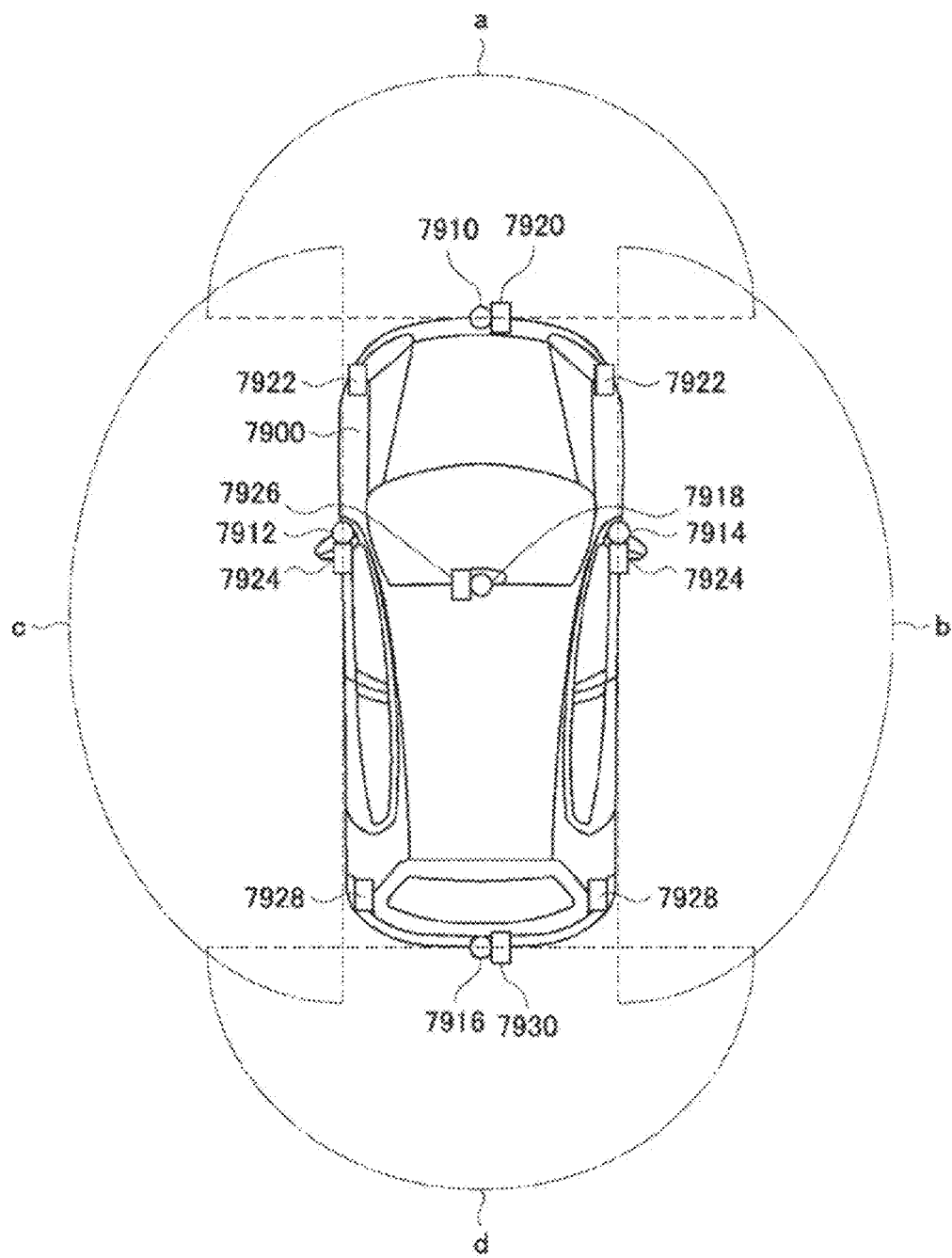
FIG. 24 is an explanatory diagram showing an example of installation positions of an external information detector and imaging units.

1. First embodiment: Image processing system (FIGS. 1, 2, 3, 4, 5, 6A, 6B, 6C, 6D, 7, 8A, 8B, 8C, 8D, 9A, 9B, 9C, 9D, and 10)
2. Second embodiment: Image processing system (FIG. 11)
3. Third embodiment Image processing system (FIGS. 12 and 13)
4. Fourth embodiment: Image processing system (FIGS. 14, 15A, 15B, 15C, 15D, 15E, 16, 17A, 17B, 17C, 17D, 17E, 18A, 18B, 18C, 18D, and 19)
5. Fifth embodiment: Image processing system (FIG. 20)
6. Sixth embodiment: Image processing system (FIG. 21)
7. Seventh embodiment: Computer (FIG. 22)
8. Example Applications (FIGS. 23 and 24)

First Embodiment (Example Configuration of an Image Processing System)

Figure 1:
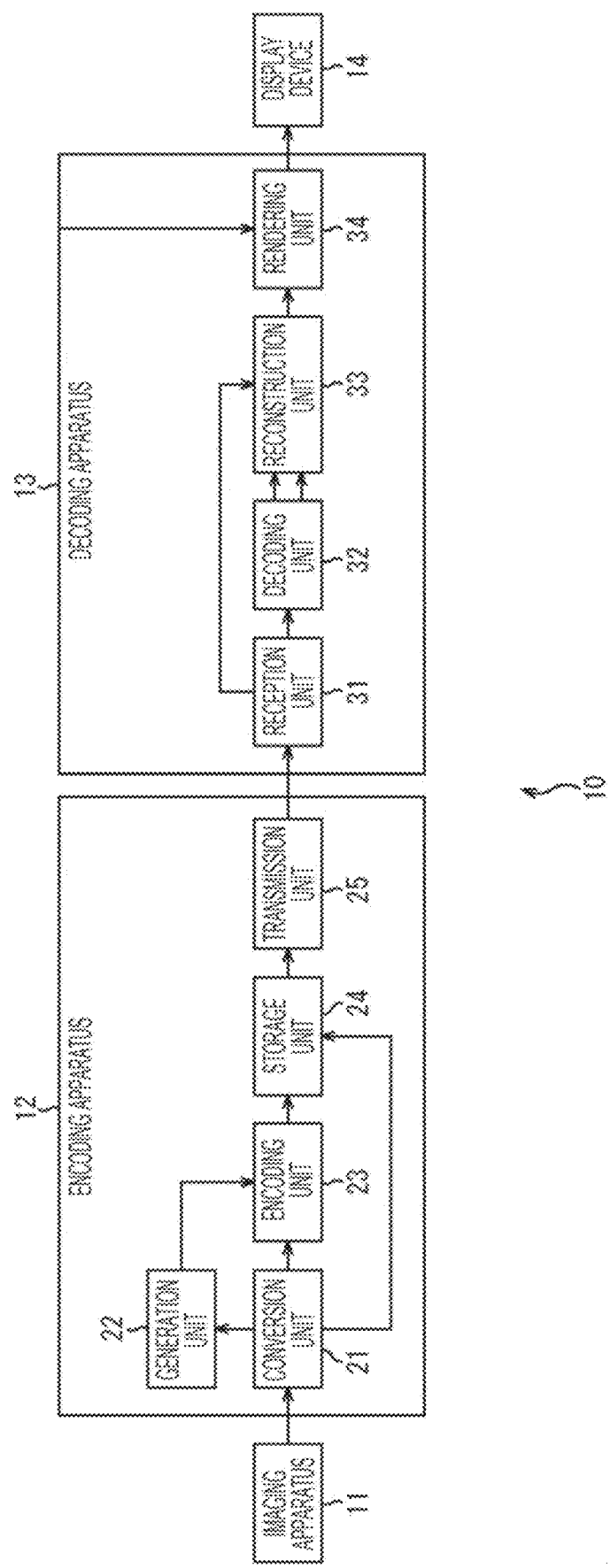
FIG. 1 is a block diagram showing an example configuration of a first embodiment of an image processing system to which the present disclosure is applied.

FIG. 1 is a block diagram showing an example configuration of a first embodiment of an image processing system to which the present disclosure is applied.

An image processing system 10 in FIG. 1 includes an imaging apparatus 11, an encoding apparatus 12 (image processing apparatus), a decoding apparatus 13 (image processing apparatus), and a display device 14. The image processing system 10 generates and displays a color image of a display viewpoint, using a color image and a depth image acquired by the imaging apparatus 11.

Specifically, the imaging apparatus 11 of the image processing system 10 includes a multi-view camera, a distance measuring instrument, and an image processing unit, for example. The multi-view camera of the imaging apparatus 11 is formed with a plurality of cameras. The respective cameras capture moving images of color images of an object, the moving images having at least one common portion. The distance measuring instrument is provided in each camera, for example, and generates a moving image of a depth image having the same viewpoint as that camera.

The image processing unit of the imaging apparatus 11 generates a 3D model of the object by calculating a visual hull or the like for each frame, using the moving images of the color images and the depth images of the viewpoints of the respective cameras, and external parameters and internal parameters of the respective cameras. The image processing unit generates the 3D data of the object, which is shape information (connectivity) indicating the three-dimensional positions of the vertices of the respective polygon meshes constituting the 3D model and the connection between the vertices, and color information about the polygon meshes.

The method adopted for generating the 3D data at the image processing unit may be the method described in Non-Patent Document 1 or the like, for example. Note that the 3D data may contain shape information and color images of the viewpoints of the respective cameras. The image processing unit supplies the 3D data to the encoding apparatus 12.

The encoding apparatus 12 includes a conversion unit 21, a generation unit 22, an encoding unit 23, a storage unit 24, and a transmission unit 25.

The conversion unit 21 of the encoding apparatus 12 determines a plurality of viewpoints of a color image and a depth image of the 3D model to be generated. Here, it is assumed that the viewpoints of the color image and the depth image to be generated are the same. However, the viewpoints and the number of viewpoints of the color image and the depth image may differ.

The conversion unit 21 generates external parameters and internal parameters for virtual cameras of the plurality of viewpoints that have been determined. On the basis of the external parameters and the internal parameters for the respective virtual cameras, the conversion unit 21 generates, from the 3D data supplied on a frame-by-frame basis from the imaging apparatus 11, a color image of each frame acquired by each virtual camera and a depth image corresponding to the color image.

The method adopted for generating a color image and a depth image from the 3D data may be the method disclosed by Masayuki Tanimoto in "Realizing the Ultimate Visual Communication", IEICE Technical Report, CS, Communication Systems vol. 110 (no. 323), pp. 73-78, Nov. 25, 2010, and the like, for example.

For example, the depth image may be an image that has a pixel value obtained by quantizing the distance Z in the depth direction between the viewpoint and the object at each pixel. In this case, the pixel value p of each pixel in the depth image is expressed by the following expression (1), for example.

[Expression 1]

$$p=(Z-Zmin)/(Zmax-Zmin)\times((1<<bitdepth)-1) \quad (1)$$

Note that Zmin and Zmax represent the minimum value and the maximum value of the distance Z, respectively. Further, "bitdepth" represents the bit width of the pixel value p. According to the expression (1), the pixel value p is a value obtained by quantizing the distance Z in the range from the minimum value Zmin to the maximum value Zmax into a bit with the bit width "bitdepth". The greater the pixel value p, the longer the distance Z (the object is farther from the viewpoint). The smaller the pixel value p, the shorter the distance Z (the object is closer to the viewpoint). The minimum value Zmin and the maximum value Zmax may vary with each viewpoint, or may be the same for all the viewpoints.

Further, the depth image may be an image that has a pixel value obtained by quantizing the reciprocal 1/Z of the distance Z at each pixel. In this case, the pixel value p of each pixel in the depth image is expressed by the following expression (2).

[Expression 2]

$$p=(1/Z-1/Zmax)/(1/Zmin-1/Zmax)\times \\ ((1<<bitdepth)-1) \quad (2)$$

According to the expression (2), the pixel value p is a value obtained by quantizing the reciprocal 1/Z in the range from the minimum value 1/Zmax to the maximum value 1/Zmin into a bit with the bit width "bitdepth". The smaller the pixel value p, the longer the distance Z (the object is farther from the viewpoint). The greater the pixel value p, the shorter the distance Z (the object is closer to the viewpoint).

Note that the calculation formula for determining the pixel value p may be other than the expressions (1) and (2). The calculation formula for determining the pixel value p may vary with each viewpoint, or may be the same for all the viewpoints.

The conversion unit 21 supplies the color image of each virtual camera to the generation unit 22 and the encoding unit 23, and supplies the depth image to the encoding unit 23. The conversion unit 21 also supplies the storage unit 24 with the external parameters and the internal parameters for the respective virtual cameras as virtual viewpoint information.

For each virtual camera, the generation unit 22 generates a silhouette image showing a foreground silhouette as foreground information about the foreground of the viewpoint of the virtual camera, from the color image supplied from the conversion unit 21. Specifically, for each virtual camera, the generation unit 22 extracts a color image of the background from the color image of the entire 3D model supplied from the conversion unit 21. The generation unit 22 then generates a difference between the color image of the entire 3D model and the color image of the background as a silhouette image for each virtual camera. As a result, the silhouette image becomes an image that is white (the pixel value being 255) only in the foreground region on which the 3D model of the foreground in the color image of the entire 3D model of each virtual camera is projected, and is black (the pixel value being 0) in the background region.

Note that the pixel value of the foreground region of the silhouette image may be the ID assigned to the 3D model of the foreground corresponding to the foreground region. The generation unit 22 generates a depth-related image of YUV 420 having the depth image supplied from the conversion unit 21 as the luminance component and the silhouette image as the color component, and supplies the depth-related image to the encoding unit 23.

The encoding unit 23 encodes the color image of each virtual camera supplied from the conversion unit 21, and the depth-related image of each virtual camera supplied from the generation unit 22. The encoding method adopted herein may be Advanced Video Coding (AVC), High Efficiency Video Coding (HEVC), or the like. The encoding unit 23 supplies the encoded stream obtained as a result of the encoding to the storage unit 24.

The storage unit 24 stores the virtual viewpoint information supplied from the conversion unit 21, and the encoded stream supplied from the encoding unit 23.

The transmission unit 25 reads the virtual viewpoint information as metadata from the storage unit 24, and transmits the metadata to the decoding apparatus 13. The transmission unit 25 also reads the encoded stream, and transmits the encoded stream to the decoding apparatus 13.

As described above, the encoding apparatus 12 encodes a depth image and a silhouette image as one depth-related image, and transmits the depth-related image to the decoding apparatus 13. Therefore, the network bandwidth between the encoding apparatus 12 and the decoding apparatus 13 can be made smaller than in a case where the depth image and the silhouette image are encoded as separate images and are transmitted as separate images to the decoding apparatus 13

The decoding apparatus 13 includes a reception unit 31, a decoding unit 32, a reconstruction unit 33, and a rendering unit 34. External parameters and internal parameters for a virtual camera of the display viewpoint are input from the user viewing the display device 14 to the decoding apparatus 13, and are supplied as display viewpoint information to the rendering unit 34.

The reception unit 31 of the decoding apparatus 13 receives the virtual viewpoint information and the encoded stream transmitted from the transmission unit 25 of the encoding apparatus 12. The reception unit 31 supplies the virtual viewpoint information to the reconstruction unit 33, and supplies the encoded stream to the decoding unit 32.

The decoding unit 32 decodes the encoded stream supplied from the reception unit 31 by a method compatible with the encoding method at the encoding unit 23. The decoding unit 32 supplies the resultant color image and depth-related image of each virtual camera to the reconstruction unit 33.

On the basis of the virtual viewpoint information supplied from the reception unit 31 and the color images and the depth-related images supplied from the decoding unit 32, the reconstruction unit 33 (the 3D model generation unit) reconstructs (generates) only the 3D data of the 3D model of the foreground.

Note that the number of viewpoints of the depth-related images to be used for reconstruction of the foreground 3D data may be any number that is equal to or smaller than the number of viewpoints of the depth-related images transmitted from the encoding apparatus 12. The larger the number of viewpoints corresponding to the depth-related images to be used for reconstruction of the 3D model of the foreground, the higher the accuracy of the 3D model of the foreground. The depth-related images to be used for reconstruction of the 3D data of the foreground may be determined in accordance with the capability of the decoding apparatus 13 and the state of the network bandwidth between the encoding apparatus 12 and the decoding apparatus 13. The reconstruction unit 33 supplies the 3D data of the foreground to the rendering unit 34.

Like the conversion unit 21, on the basis of the display viewpoint information, the rendering unit 34 generates a foreground color image of the display viewpoint as a display image from the 3D data supplied from the reconstruction unit 33, and supplies the foreground display image to the display device 14.

The display device 14 is formed with a two-dimensional head mounted display (HMD), a two-dimensional monitor, or the like. The display device 14 two-dimensionally displays a display image on the basis of the display image supplied from the reconstruction unit 33.

Note that the display device 14 may be formed with a three-dimensional head mounted display, a three-dimensional monitor, or the like. In this case, the rendering unit 34 generates a foreground depth image of the display viewpoint from the 3D data on the basis of the display viewpoint information like the conversion unit 21, and supplies the foreground depth image to the display device 14. The display device 14 three-dimensionally displays a display image on the basis of the display image and the depth image supplied from the rendering unit 34.

Further, in the example shown in FIG. 1, the 3D model is generated through calculation of a visual hull or the like, but may be generated with point clouds. In this case, the 3D data includes the position and color information about each point cloud, or the position of each point cloud and a color image of the viewpoint of each camera.

As described above, in the image processing system 10, the encoding apparatus 12 performs encoding by converting the 3D data into color images and depth images of virtual cameras of a plurality of viewpoints. Accordingly, the encoding method that can be adopted here may be a highly-compressed two-dimensional moving image encoding method such as AVC or HEVC. As a result, information indicating a 3D model can be transmitted at a lower bit rate than in a case where 3D data is transmitted as it is.

(Relationship between the Distance Z and the Pixel Value p)

Figure 2:
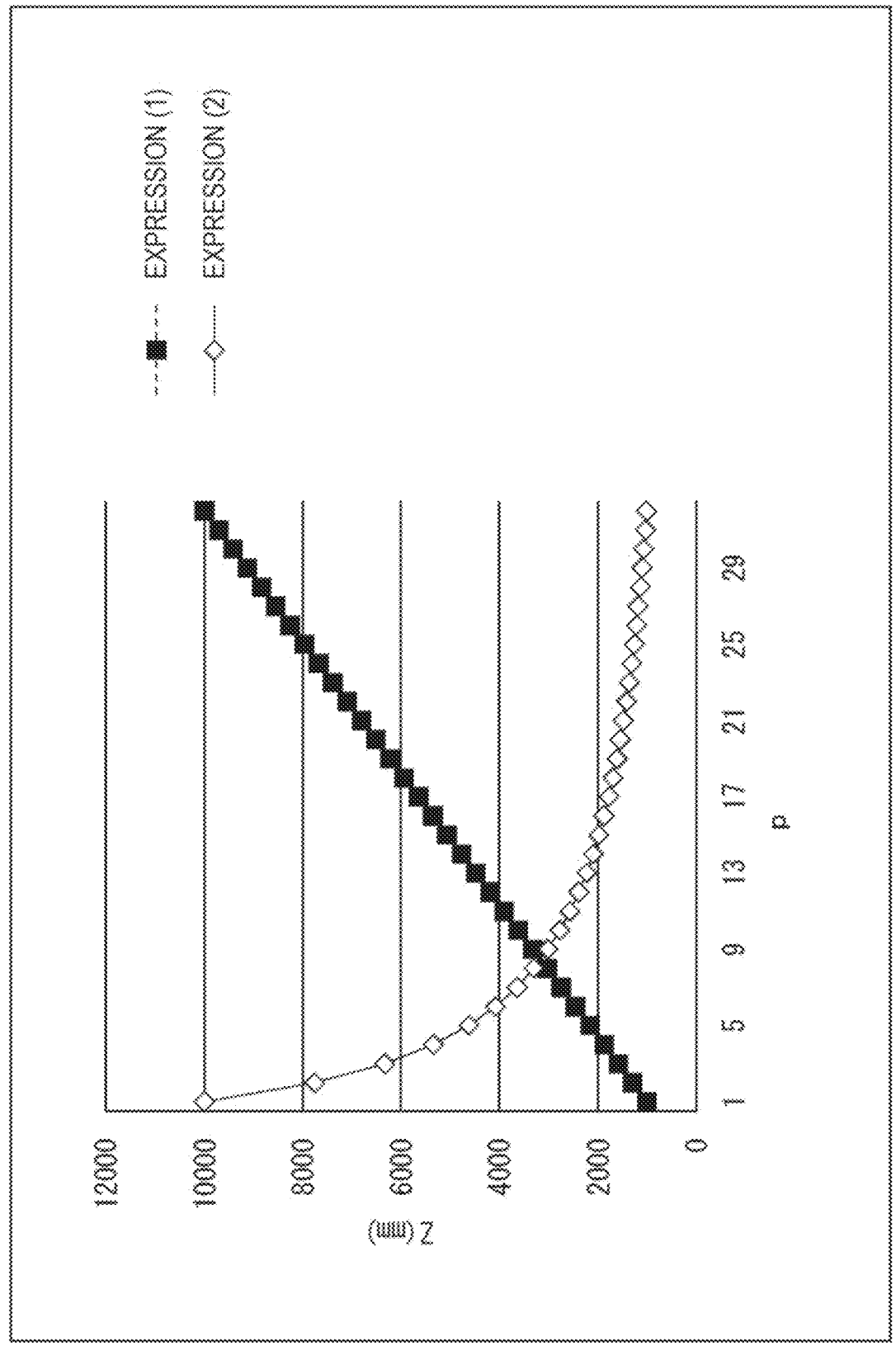
FIG. 2 is a graph showing the relationship between a distance Z and a pixel value p.

FIG. 2 is a graph showing the relationship between the distance Z and the pixel value p obtained according to the expressions (1) and (2).

In the graph in FIG. 2, the abscissa axis indicates the pixel value p, and the ordinate axis indicates the distance Z. Further, in the example shown in FIG. 2, the minimum value Zmin is 1000 mm, the maximum value Zmax is 10000 mm, and the bit width "bitdepth" is 5 bits.

In this case, according to the expression (1), the distance Z range of 1000 mm to 10000 mm is divided into 32 equal portions, and different pixel values p are assigned to the respective portions of the divided distance Z range, as indicated by a dotted line in FIG. 2. Therefore, the distance Z range corresponding to each pixel value p is the same. In other words, the quantization step is constant.

On the other hand, according to the expression (2), the range of the reciprocal 1/Z of the distance Z, which is from $\frac{1}{10000}$ mm to $\frac{1}{1000}$ mm, is divided into 32 equal portions, and different pixel values p are assigned to the respective portions of the divided reciprocal 1/Z range, as indicated by a solid line in FIG. 2. Accordingly, the smaller the pixel value p, the wider the distance Z range corresponding to that value. The greater the pixel value p, the narrower the distance Z range corresponding to that value. In other words, where the object is farther from the viewpoint, the quantization step of the pixel value p is larger. Where the object is closer to the viewpoint, the quantization step of the pixel value p is smaller. Since the error of the distance Z affects the accuracy of a 3D model greater when the object is located closer to the viewpoint, the accuracy of the 3D model can be increased by determining the pixel value according to the expression (2).

Note that, in the description below, the pixel value of a depth image is determined according to the expression (1), unless otherwise specified.

(Description of an Encoding Process at the Encoding Apparatus)

Figure 3:
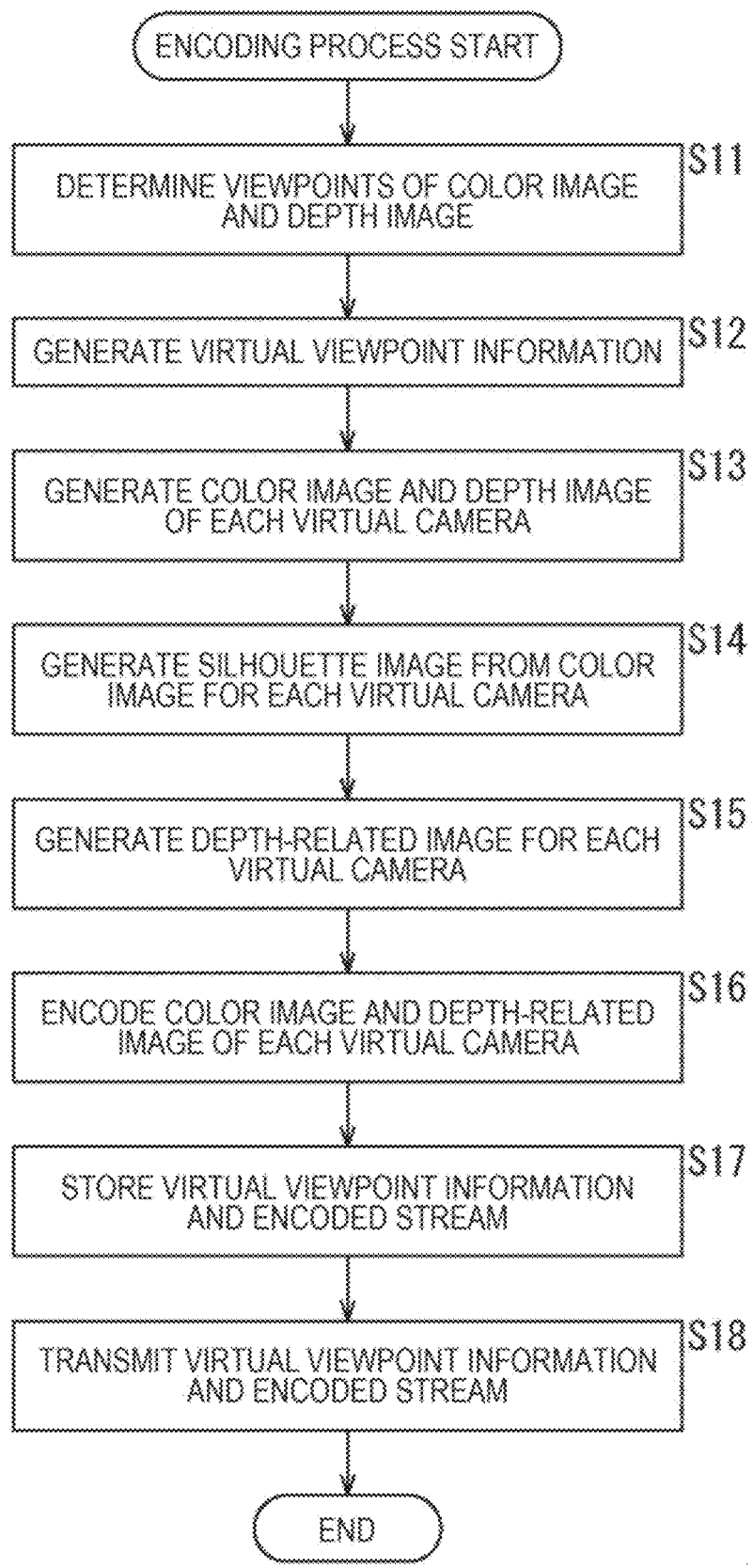
FIG. 3 is a flowchart for explaining an encoding process to be performed by the encoding apparatus shown in FIG. 1.

FIG. 3 is a flowchart for explaining an encoding process to be performed by the encoding apparatus 12 shown in FIG. 1. This encoding process is started when 3D data is supplied from the imaging apparatus 11 on a frame-by-frame basis, for example.

In step S11 in FIG. 3, the conversion unit 21 of the encoding apparatus 12 determines a plurality of viewpoints of a color image and a depth image of the 3D model to be generated.

In step S12, the conversion unit 21 generates external parameters and internal parameters for virtual cameras of the determined plurality of viewpoints as virtual viewpoint information, and supplies the virtual viewpoint information to the storage unit 24.

In step S13, on the basis of the virtual viewpoint information, the conversion unit 21 generates color images and depth images of the viewpoints of the respective virtual cameras from the 3D data supplied on a frame-by-frame basis from the imaging apparatus 11. The conversion unit 21 supplies the color images of the viewpoints of the respective virtual cameras to the generation unit 22 and the encoding unit 23, and supplies the depth images to the generation unit 22.

In step S14, the generation unit 22 generates a silhouette image from the color images supplied from the conversion unit 21 for the respective virtual cameras.

In step S15, the generation unit 22 generates a depth-related image for each virtual camera, using the depth image supplied from the conversion unit 21 as the luminance component and the silhouette image as the color component. The generation unit 22 then supplies the depth-related image to the encoding unit 23.

In step S16, the encoding unit 23 encodes the color image of each virtual camera supplied from the conversion unit 21, and the depth-related image of each virtual camera supplied from the generation unit 22. The encoding unit 23 supplies the encoded stream obtained as a result of the encoding to the storage unit 24.

In step S17, the storage unit 24 stores the virtual viewpoint information supplied from the conversion unit 21, and the encoded stream supplied from the encoding unit 23.

In step S18, The transmission unit 25 reads the virtual viewpoint information and the encoded stream stored in the storage unit 24, and transmits the virtual viewpoint information and the encoded stream to the decoding apparatus 13.

(Example Configuration of the Reconstruction Unit)

Figure 4:
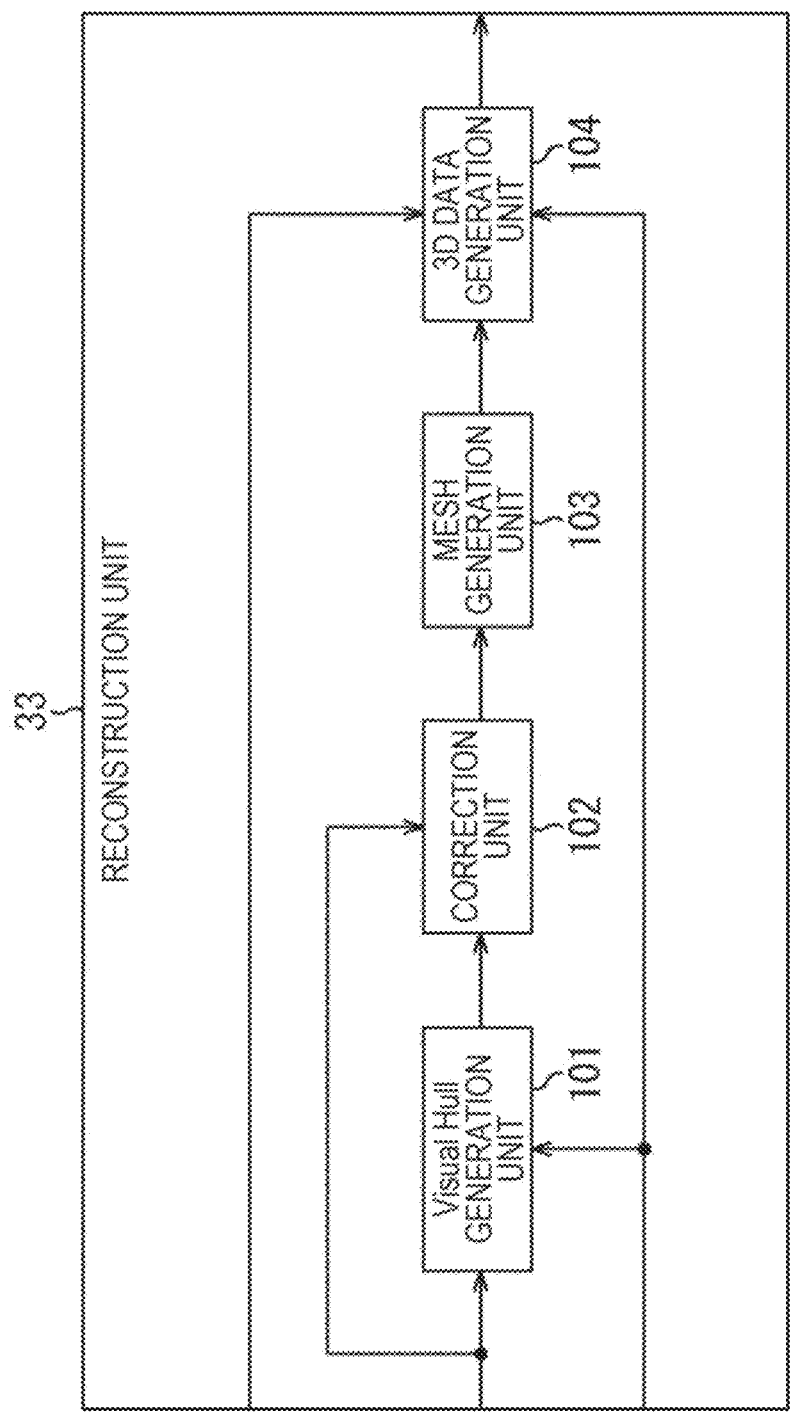
FIG. 4 is a block diagram showing an example configuration of the reconstruction unit shown in FIG. 1.

FIG. 4 is a block diagram showing an example configuration of the reconstruction unit 33 shown in FIG. 1.

The reconstruction unit 33 in FIG. 4 includes a visual hull generation unit 101, a correction unit 102, a mesh generation unit 103, and a 3D data generation unit 104.

The visual hull generation unit 101 of the reconstruction unit 33 generates a visual hull, on the basis of the virtual viewpoint information supplied from the reception unit 31 in FIG. 1, and the silhouette image as the color component of the depth-related image of each viewpoint supplied from the decoding unit 32. A visual hull is the intersection space of a cone that is formed, for each camera, from the optical centers of a plurality of cameras and the silhouettes of the object captured by the cameras. The visual hull generation unit 101 supplies the generated visual hull to the correction unit 102.

The correction unit 102 corrects the visual hull supplied from the visual hull generation unit 101, on the basis of the depth images as the luminance components of the depth-related images of the respective viewpoints supplied from the decoding unit 32. By doing so, the correction unit 102 generates a 3D model of the foreground. The correction unit 102 supplies the 3D model of the foreground to the mesh generation unit 103.

The mesh generation unit 103 converts the 3D model (Voxel) of the foreground into one or more polygon meshes. The mesh generation unit 103 supplies shape information about the respective polygon meshes of the 3D model of the foreground to the 3D data generation unit 104.

On the basis of the virtual viewpoint information supplied from the reception unit 31 and the color images of the respective viewpoints supplied from the decoding unit 32, the 3D data generation unit 104 generates color information about the polygon meshes corresponding to the respective pieces of the shape information supplied from the mesh generation unit 103. The 3D data generation unit 104 supplies the shape information and the color information about the respective polygon meshes as the 3D data of the 3D model of the foreground to the rendering unit 34 in FIG. 1.

(Description of a Method of Generating a 3D Model of the Foreground)

FIGS. 5, 6A, 6B, 6C, 6D, 7, 8A, 8B, 8C, 8D, 9A, 9B, 9C, and 9D are diagrams for explaining a method of generating a 3D model of the foreground with the reconstruction unit 33 shown in FIG. 4.

In the example shown in FIGS. 5, 6A, 6B, 6C, 6D, 7, 8A, 8B, 8C, 8D, 9A, 9B, 9C, and 9D, the shape of a foreground object 121 is a triangular prism. FIGS. 5, 6A, 6B, 6C, 6D, 7, 8A, 8B, 8C, 8D, 9A, 9B, 9C, and 9D are also views of the object 121 as viewed from above the virtual cameras.

Figure 5:
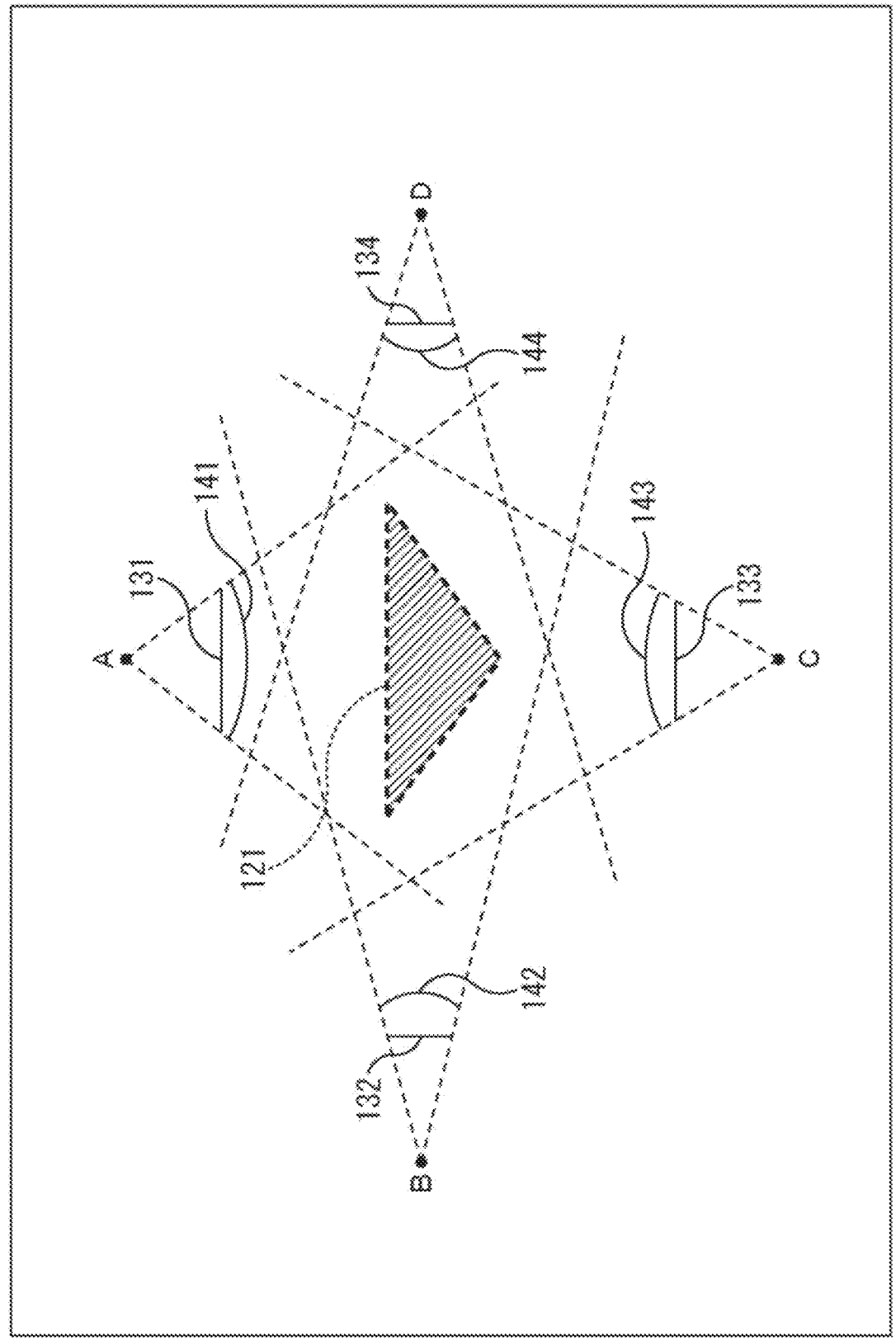
FIG. 5 is a diagram for explaining a method of generating a 3D model of a foreground with the reconstruction unit shown in FIG. 4.
Figure 7:
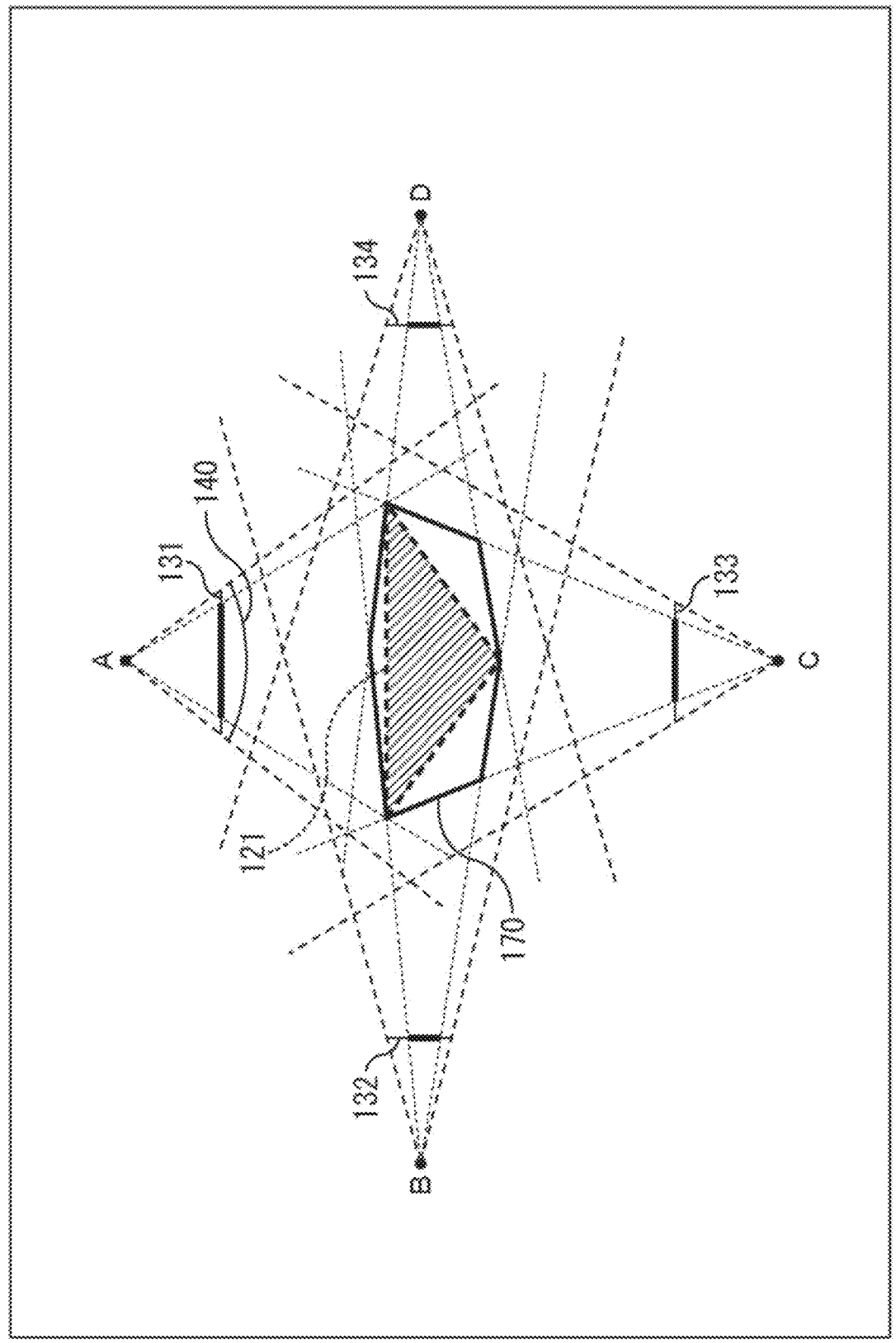
FIG. 7 is a diagram for explaining a method of generating a 3D model of a foreground with the reconstruction unit shown in FIG. 4.
Figure 8:
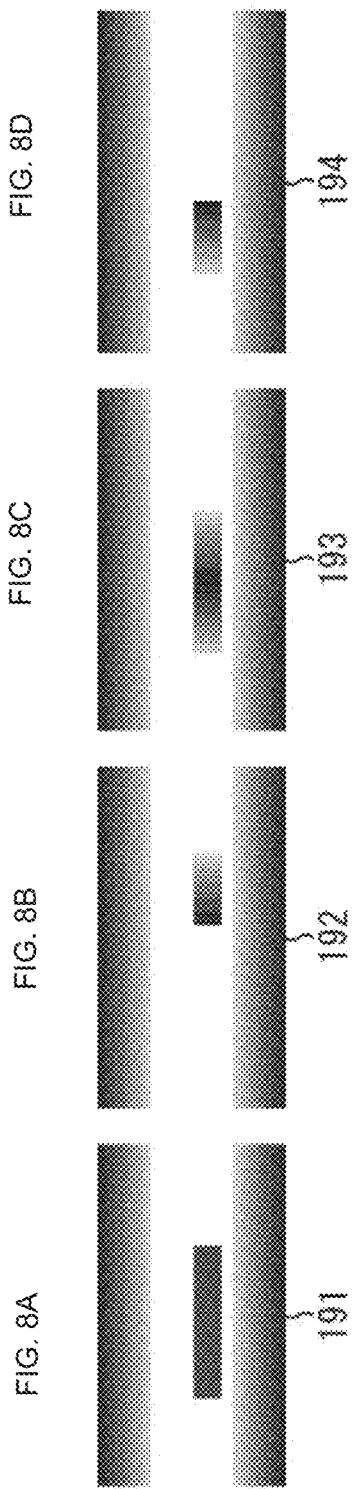
FIGS. 8A, 8B, 8C, and 8D are diagrams for explaining a method of generating a 3D model of a foreground with the reconstruction unit shown in FIG. 4.

Further, in the example shown in FIGS. 5, 6A, 6B, 6C, 6D, 7, 8A, 8B, 8C, 8D, 9A, 9B, 9C, and 9D, the viewpoints of the virtual cameras are a total of four viewpoints A through D that are arranged to surround the object 121, as shown in FIG. 5. Further, the screen (projection plane) 131 of the viewpoint A is located within an angle of view 141 around the viewpoint A. Like the screen 131 of the viewpoint A, the screens 132 through 134 of the viewpoints B through D are also located within an angle of view 142, an angle of view 143, and an angle of view 144, respectively.

In this case, the silhouette images of viewpoints A through D in FIG. 5 are silhouette images 151 through 154 shown in FIGS. 6A, 6B, 6C, and 6D. Accordingly, the visual hull generation unit 101 generates a visual hull 170 shown in FIG. 7, on the basis of virtual viewpoint information about the viewpoints A through D and the silhouette images 151 through 154.

Figure 9:
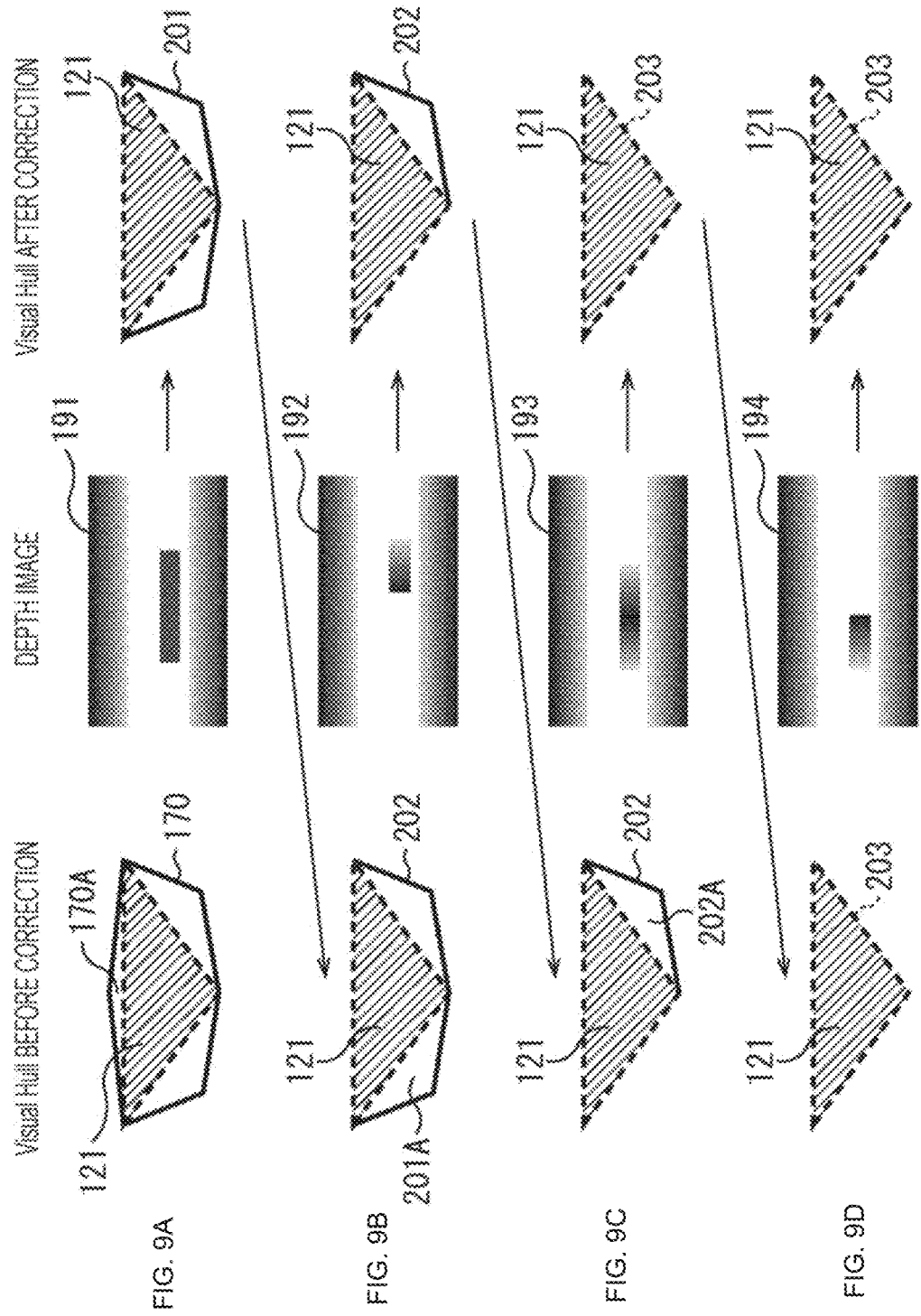
FIGS. 9A, 9B, 9C, and 9D are diagrams for explaining a method of generating a 3D model of a foreground with the reconstruction unit shown in FIG. 4.

Meanwhile, the depth images of the viewpoints A through D in FIG. 5 are depth images 191 through 194 shown in FIGS. 8A, 8B, 8C, and 8D. Therefore, as shown in FIG. 9A, the correction unit 102 first corrects the visual hull 170 generated by the visual hull generation unit 101, on the basis of the depth image 191. By doing so, the correction unit 102 generates a visual hull 201. Specifically, the correction unit 102 recognizes, from the depth image 191, that the distance Z in the depth direction between the entire viewpoint-A side surface of the 3D model of the foreground to be generated and the viewpoint A is constant. However, the distance Z in the depth direction between the entire viewpoint-A side surface of the visual hull 170 and the viewpoint A is not constant. Therefore, the correction unit 102 deletes a convex portion 170A of the viewpoint-A side surface of the visual hull 170 so that the distance Z becomes constant. By doing so, the correction unit 102 generates the visual hull 201.

The correction unit 102 then corrects the visual hull 201 on the basis of the depth image 192, and generates a visual hull 202, as shown in FIG. 9B. Specifically, from the depth image 192, the correction unit 102 recognizes that the distance Z in the depth direction between the viewpoint-B side surface of the 3D model of the foreground to be generated and the viewpoint B increases in the direction toward the right as viewed from the viewpoint B. However, the distance Z in the depth direction between the viewpoint-B side surface of the visual hull 202 and the viewpoint B increases toward the right as viewed from the viewpoint B, but does not change significantly. Therefore, the correction unit 102 deletes a convex portion 201A of the viewpoint-B side surface of the visual hull 201 so that the distance Z increases in the direction toward the right as viewed from the viewpoint B. By doing so, the correction unit 102 generates the visual hull 202.

The correction unit 102 then corrects the visual hull 202 on the basis of the depth image 193, and generates a visual hull 203, as shown in FIG. 9C. Specifically, from the depth image 193, the correction unit 102 recognizes that the distance Z in the depth direction between the viewpoint-C side surface of the 3D model of the foreground to be generated and the viewpoint C increases in the direction toward the left or the right from a predetermined position, as viewed from the viewpoint C.

On the left side of the predetermined position on the viewpoint-C side surface of the visual hull 202 as viewed from the viewpoint C, the distance Z in the depth direction from the viewpoint C increases in the direction toward the left. Therefore, the correction unit 102 does not perform any correction on the left side. However, on the right side of the predetermined position on the viewpoint-C side surface of the visual hull 202 as viewed from the viewpoint C, the distance in the depth direction from the viewpoint C increases in the direction toward the right but does not change significantly. Therefore, the correction unit 102 deletes a convex portion 202A of the visual hull 202 on the right side of the predetermined position as viewed from the viewpoint C, so that the distance Z increases in the direction toward the right from the predetermined position as viewed from the viewpoint C. By doing so, the correction unit 102 generates the visual hull 203.

Finally, the correction unit 102 generates the visual hull 203 as a corrected visual hull 203 on the basis of the depth image 194, as shown in FIG. 9D. Specifically, from the depth image 194, the correction unit 102 recognizes that the distance Z in the depth direction between the viewpoint-D side surface of the 3D model of the foreground to be generated and the viewpoint D increases in the direction toward the left as viewed from the viewpoint D. Since the distance Z in the depth direction between the viewpoint-D side surface of the visual hull 203 and the viewpoint D increases in the direction toward the left as viewed from the viewpoint D, the correction unit 102 does not perform any correction on the visual hull 203.

As described above, the correction unit 102 corrects the visual hull 170 on the basis of the depth images 191 through 194, to generate the visual hull 203 having the same shape as the foreground object 121. The correction unit 102 then supplies the visual hull 203 as the 3D model of the foreground to the mesh generation unit 103.

(Description of a Process at the Decoding Apparatus)

Figure 10:
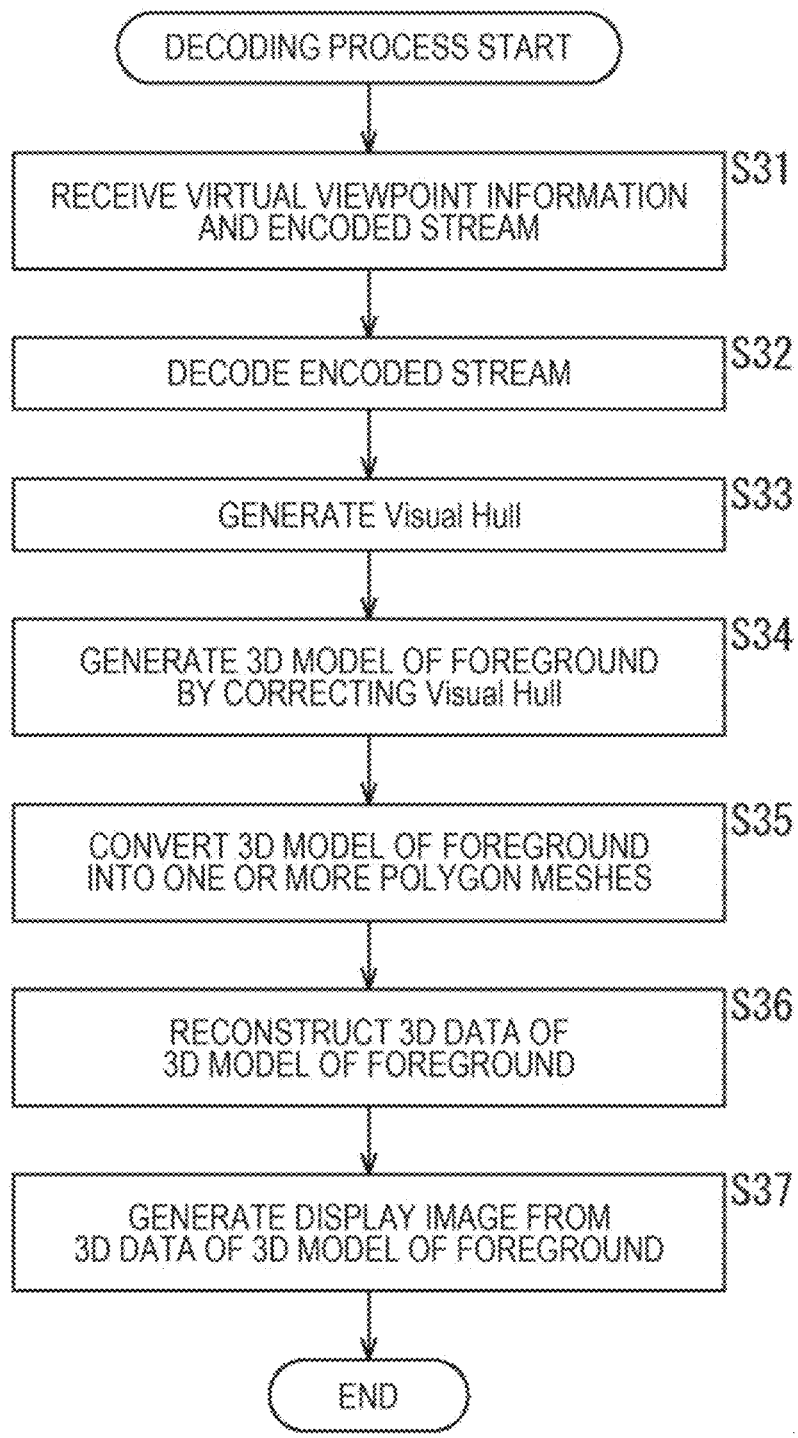
FIG. 10 is a flowchart for explaining a decoding process to be performed by the decoding apparatus shown in FIG. 1.

FIG. 10 is a flowchart for explaining a decoding process to be performed by the decoding apparatus 13 shown in FIG. 1. This decoding process is started when the encoded stream and the virtual viewpoint information are transmitted frame by frame from the transmission unit 25 of the encoding apparatus 12, for example.

In step S31 in FIG. 10, the reception unit 31 of the decoding apparatus 13 receives the virtual viewpoint information and the encoded stream transmitted from the transmission unit 25 of the encoding apparatus 12. The reception unit 31 supplies the virtual viewpoint information to the reconstruction unit 33, and supplies the encoded stream to the decoding unit 32.

In step S32, the decoding unit 32 decodes the encoded stream supplied from the reception unit 31 by a method compatible with the encoding method at the encoding unit 23. The decoding unit 32 supplies the resultant color image and depth-related image of each virtual camera to the reconstruction unit 33.

In step S33, the visual hull generation unit 101 (FIG. 4) of the reconstruction unit 33 generates a visual hull, on the basis of the virtual viewpoint information supplied from the reception unit 31, and the silhouette image as the color component of the depth-related image of each virtual camera supplied from the decoding unit 32. The visual hull generation unit 101 supplies the generated visual hull to the correction unit 102.

In step S34, the correction unit 102 corrects the visual hull supplied from the visual hull generation unit 101, on the basis of the depth images as the luminance components of the depth-related images of the respective virtual cameras supplied from the decoding unit 32. By doing so, the correction unit 102 generates a 3D model of the foreground. The correction unit 102 supplies the 3D model of the foreground to the mesh generation unit 103.

In step S35, the mesh generation unit 103 converts the 3D model of the foreground into one or more polygon meshes. The mesh generation unit 103 supplies shape information about the respective polygon meshes of the 3D model of the foreground to the 3D data generation unit 104.

In step S36, the 3D data generation unit 104 reconstructs the 3D data of the 3D model of the foreground, on the basis of the virtual viewpoint information, the color images of the respective virtual cameras, and the shape information about the respective polygon meshes. The 3D data generation unit 104 supplies the 3D data of the 3D model of the foreground to the rendering unit 34.

In step S37, like the conversion unit 21, the rendering unit 34 generates a foreground color image of the display viewpoint as a display image from the 3D data of the 3D model of the foreground supplied from the reconstruction unit 33, on the basis of the display viewpoint information. The rendering unit 34 supplies the foreground display image to the display device 14.

As described above, the encoding apparatus 12 transmits silhouette images of a plurality of viewpoints as foreground information, together with depth images of the plurality of viewpoints, to the decoding apparatus 13. Thus, the decoding apparatus 13 can generate only a 3D model of the foreground, on the basis of the depth images and the silhouette images of the plurality of viewpoints.

Second Embodiment (Example Configuration of the Reconstruction Unit)

A second embodiment of an image processing system to which the present disclosure is applied differs from the first embodiment in that the foreground information is not silhouette images of the respective virtual cameras but thresholds for the pixel value of the foreground in depth images of the respective virtual cameras (the thresholds will be hereinafter referred to as the foreground depth thresholds).

Specifically, the configuration of the second embodiment of an image processing system to which the present disclosure is applied is similar to the configuration shown in FIG. 1, except that the generation unit 22 generates foreground depth images in place of silhouette images, depth-related images are replaced with depth images, metadata is replaced with virtual viewpoint information and the foreground depth thresholds, and the reconstruction unit 33 has a different configuration. Therefore, explanation of the components other than the reconstruction unit 33 will not be unnecessarily repeated below.

Figure 11:
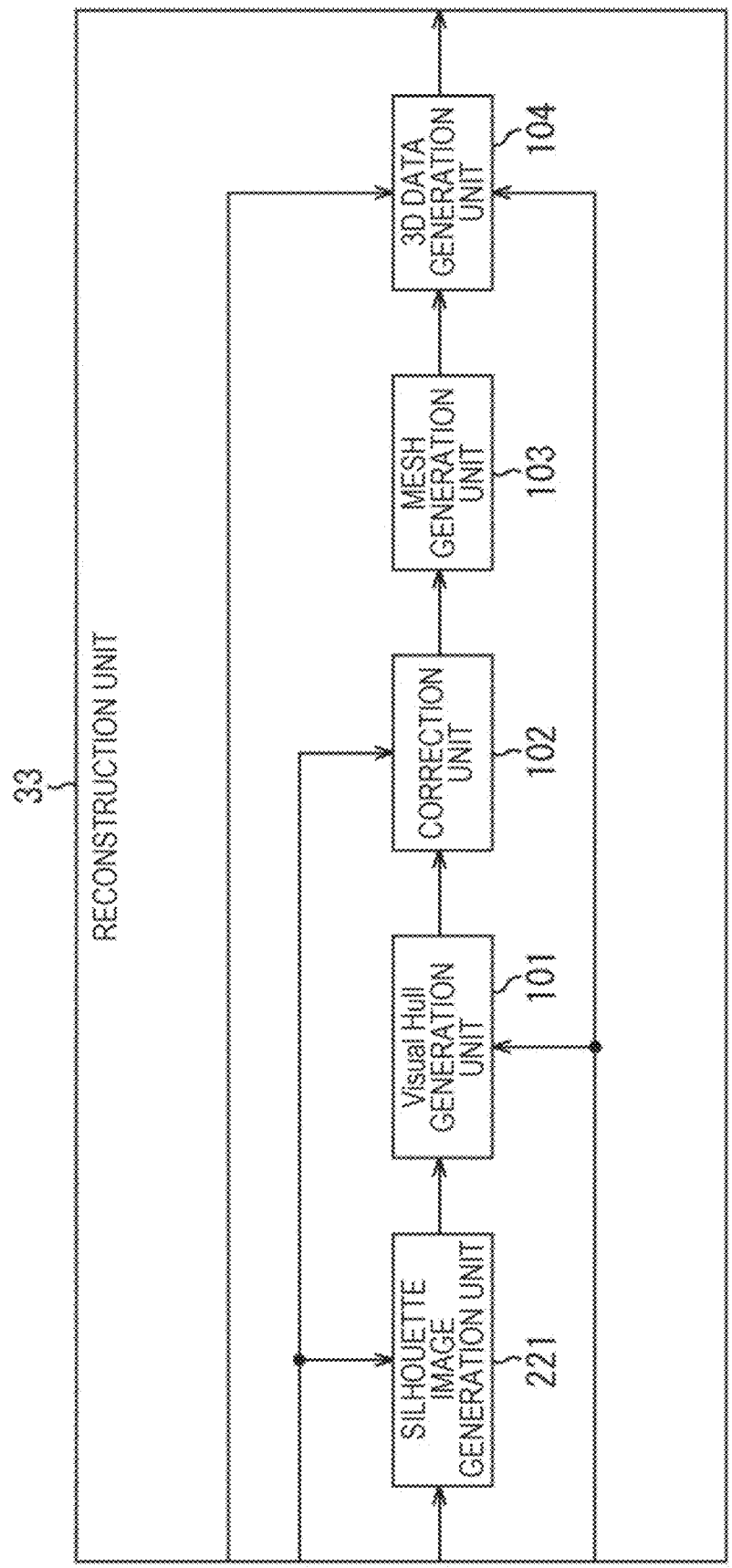
FIG. 11 is a block diagram showing the configuration of a reconstruction unit according to a second embodiment of an image processing system to which the present disclosure is applied.

FIG. 11 is a block diagram showing the configuration of the reconstruction unit 33 according to the second embodiment of an image processing system to which the present disclosure is applied.

In the configuration shown in FIG. 11, the same components as those shown in FIG. 4 are denoted by the same reference numerals as those used in FIG. 4. The explanations that have already been made will not be repeated.

The configuration of the reconstruction unit 33 in FIG. 11 differs from the configuration in FIG. 4 in that a silhouette image generation unit 221 is added.

In the second embodiment, the reception unit 31 of the decoding apparatus 13 receives an encoded stream of color images and depth images of a plurality of virtual cameras, supplies the encoded stream to the decoding unit 32, receives the foreground depth thresholds and virtual viewpoint information, and supplies the foreground depth thresholds and the virtual viewpoint information to the reconstruction unit 33. The decoding unit 32 decodes the encoded stream, and supplies the resultant color images and depth images of the plurality of virtual cameras to the reconstruction unit 33.

The silhouette image generation unit 221 (the image generation unit) of the reconstruction unit 33 generates a silhouette image for each virtual camera, on the basis of the input foreground depth thresholds and depth images.

Specifically, for each pixel of the depth images, the silhouette image generation unit 221 determines whether or not the pixel value of the pixel is equal to or smaller than the foreground depth threshold. The silhouette image generation unit 221 sets the pixel value of a silhouette image of a pixel whose pixel value is determined to be equal to or smaller than the foreground depth threshold at 255, which represents a foreground region, and sets the pixel value of a silhouette image of a pixel whose pixel value is determined to be greater than the foreground depth threshold at 0, which represents a background region.

Note that, in a case where the pixel value of a depth image is determined according to the above expression (2), the pixel value of a silhouette image of a pixel whose pixel value is determined to be equal to or smaller than the foreground depth threshold is set at 0, and the pixel value of a silhouette image of a pixel whose pixel value is determined to be greater than the foreground depth threshold is set at 255.

The silhouette image generation unit 221 can generate a silhouette image as described above. The silhouette image generation unit 221 supplies the silhouette images to the visual hull generation unit 101.

Note that a decoding process in the second embodiment is similar to the decoding process shown in FIG. 10, except that a process in which the silhouette image generation unit 221 generates silhouette images is performed before the process in step S33.

As described above, in the second embodiment, the encoding apparatus 12 transmits foreground depth thresholds for a plurality of viewpoints as foreground information, together with depth images of the plurality of viewpoints, to the decoding apparatus 13. Thus, the decoding apparatus 13 can generate only a 3D model of the foreground, on the basis of the depth images and the foreground depth thresholds of the plurality of viewpoints.

Third Embodiment (Example Configuration of the Reconstruction Unit)

A third embodiment of an image processing system to which the present disclosure is applied differs from the first embodiment in that any foreground information is not transmitted, and a depth-related image is an image that has a depth image of the foreground as the luminance component, and a depth image of the background as the color component.

Specifically, the configuration of the third embodiment of an image processing system to which the present disclosure is applied is similar to the configuration shown in FIG. 1, except that the conversion unit 21 generates depth-related images by generating depth images of the foreground separately from depth images of the background, the generation unit 22 is not provided, and the reconstruction unit 33 has a different configuration. Therefore, explanation of the components other than the reconstruction unit 33 will not be unnecessarily repeated below.

Figure 12:
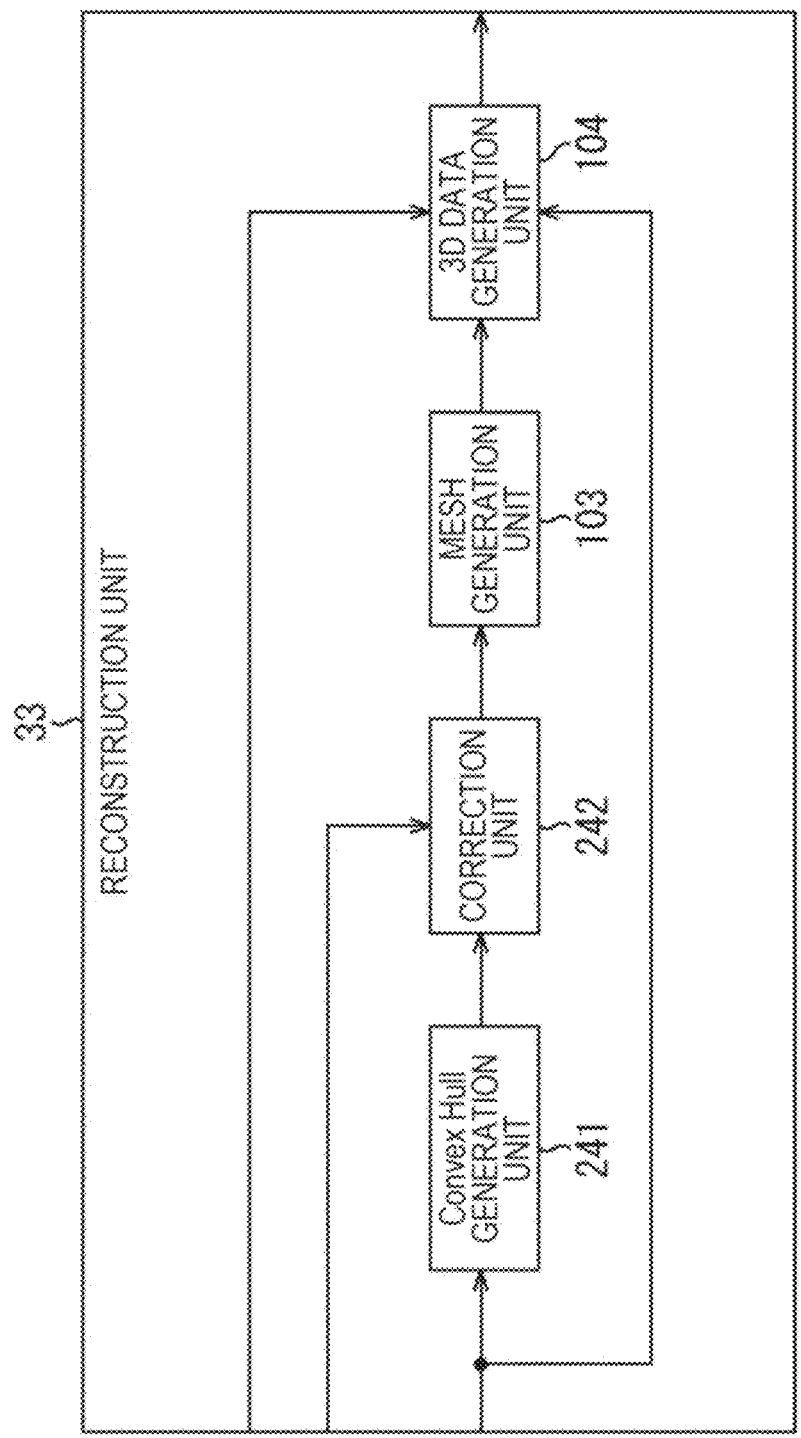
FIG. 12 is a block diagram showing the configuration of a reconstruction unit according to a third embodiment of an image processing system to which the present disclosure is applied.

FIG. 12 is a block diagram showing the configuration of the reconstruction unit 33 according to the third embodiment of an image processing system to which the present disclosure is applied.

In the configuration shown in FIG. 12, the same components as those shown in FIG. 4 are denoted by the same reference numerals as those used in FIG. 4. The explanations that have already been made will not be repeated.

The configuration of the reconstruction unit 33 shown in FIG. 12 differs from the configuration in FIG. 4 in that a convex hull generation unit 241 and a correction unit 242 are provided in place of the visual hull generation unit 101 and the correction unit 102.

In the third embodiment, the reception unit 31 of the decoding apparatus 13 receives an encoded stream of color images and depth-related images of a plurality of virtual cameras, supplies the encoded stream to the decoding unit 32, receives virtual viewpoint information, and supplies the virtual viewpoint information to the reconstruction unit 33. The decoding unit 32 decodes the encoded stream, and supplies the resultant color images and depth images of the plurality of virtual cameras to the reconstruction unit 33.

On the basis of the input virtual viewpoint information, the convex hull generation unit 241 of the reconstruction unit 33 generates a convex hull (convex polygon) included in the angles of view of all the virtual cameras, and supplies the convex hull to the correction unit 242.

On the basis of foreground depth images, which are the luminance components of the input depth-related images of the plurality of virtual cameras, the correction unit 242 corrects the convex hull supplied from the convex hull generation unit 241, to reconstruct the 3D model of the foreground, like the correction unit 102 in FIG. 4. The correction unit 242 supplies the 3D model of the foreground to the mesh generation unit 103.

The reconstruction unit 33 according to the third embodiment generates a 3D model of the foreground without the use of any foreground information as described above.

(Example of a Convex Hull)

Figure 13:
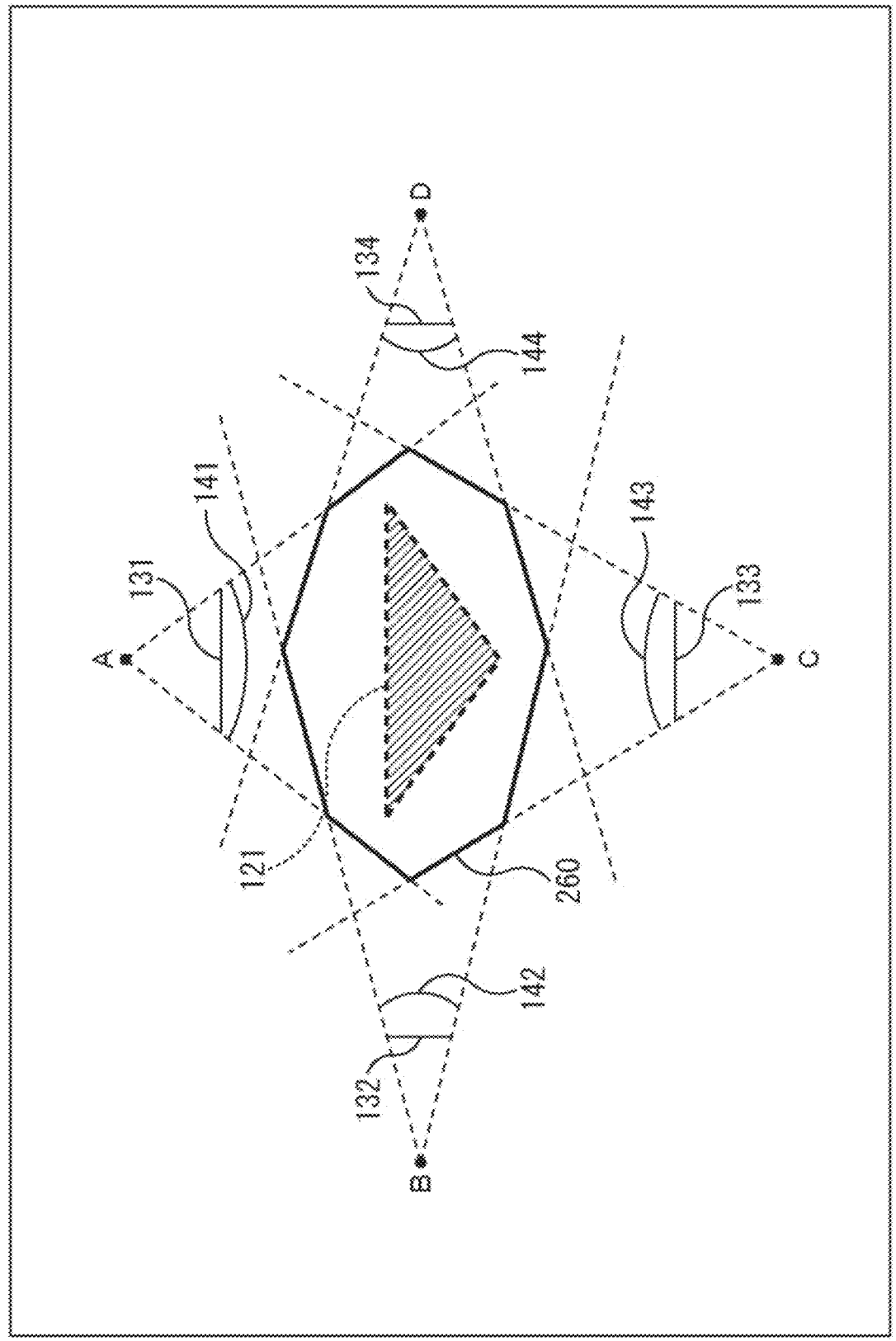
FIG. 13 is a diagram showing an example of a convex hull.

FIG. 13 is a diagram showing an example of a convex hull to be generated by the convex hull generation unit 241 shown in FIG. 12.

In FIG. 13, the same components as those shown in FIG. 5 are denoted by the same reference numerals as those used in FIG. 5. The explanations that have already been made will not be repeated.

In the example shown in FIG. 13, the viewpoints A through D are arranged so as to surround the foreground object 121, as in the example shown in FIGS. 5, 6A, 6B, 6C, 6D, 7, 8A, 8B, 8C, 8D, 9A, 9B, 9C, and 9D. In this case, the convex hull generation unit 241 generates the 3D region included in all the angles of view 141 through 144 of the viewpoints A through D as a convex hull 260.

Specifically, the convex hull generation unit 241 first generates a convex hull that is a 3D region included in the angle of view 141 of the viewpoint A. The convex hull generation unit 241 then generates a new convex hull that is a 3D region included in the angle of view 142 of the viewpoint B in the generated convex hull. After that, the convex hull is updated by sequentially using the angle of view 143 of the viewpoint C and the angle of view 144 of the viewpoint D in a manner similar to the above, so that the convex hull 260 is finally generated. This convex hull 260 includes the object 121.

Like the correction unit 102 in FIG. 4, the correction unit 242 corrects the convex hull 260 on the basis of the foreground depth images, to generate a convex hull of the same shape as the object 121 as a 3D model of the foreground.

Note that a decoding process according to the third embodiment is similar to the decoding process shown in FIG. 10, except that the process in step S33 is replaced with a process to be performed by the convex hull generation unit 241 to generate a convex hull, and the process in step S34 is replaced with a process to be performed by the correction unit 242 to generate a 3D model of the foreground by correcting the convex hull.

Fourth Embodiment (Example Configuration of the Reconstruction Unit)

A fourth embodiment of the image processing system to which the present disclosure is applied differs from the first embodiment in the method of reconstructing a 3D model. Specifically, the configuration of the fourth embodiment of an image processing system to which the present disclosure is applied is similar to the configuration shown in FIG. 1, except for the configuration of the reconstruction unit 33. Therefore, explanation of the components other than the reconstruction unit 33 will not be unnecessarily repeated below.

Figure 14:
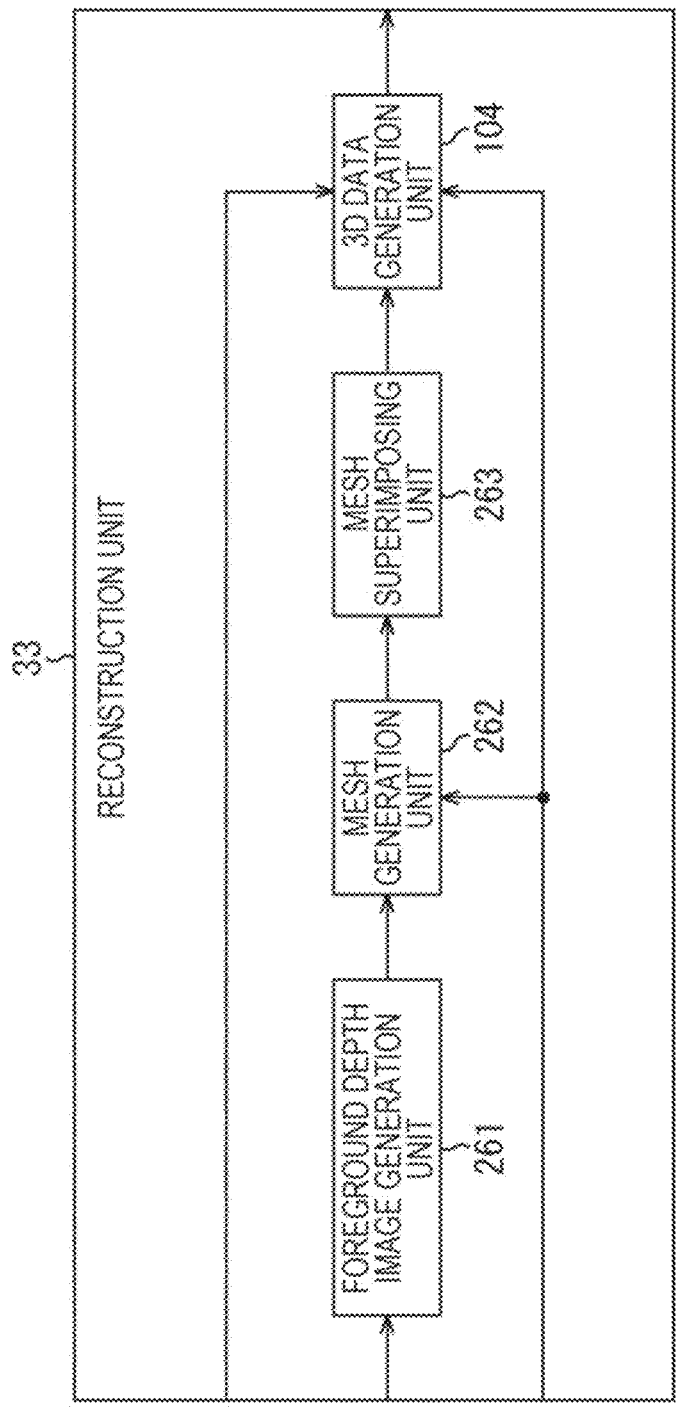
FIG. 14 is a block diagram showing an example configuration of a reconstruction unit according to a fourth embodiment of an image processing system to which the present disclosure is applied.
Figure 15:
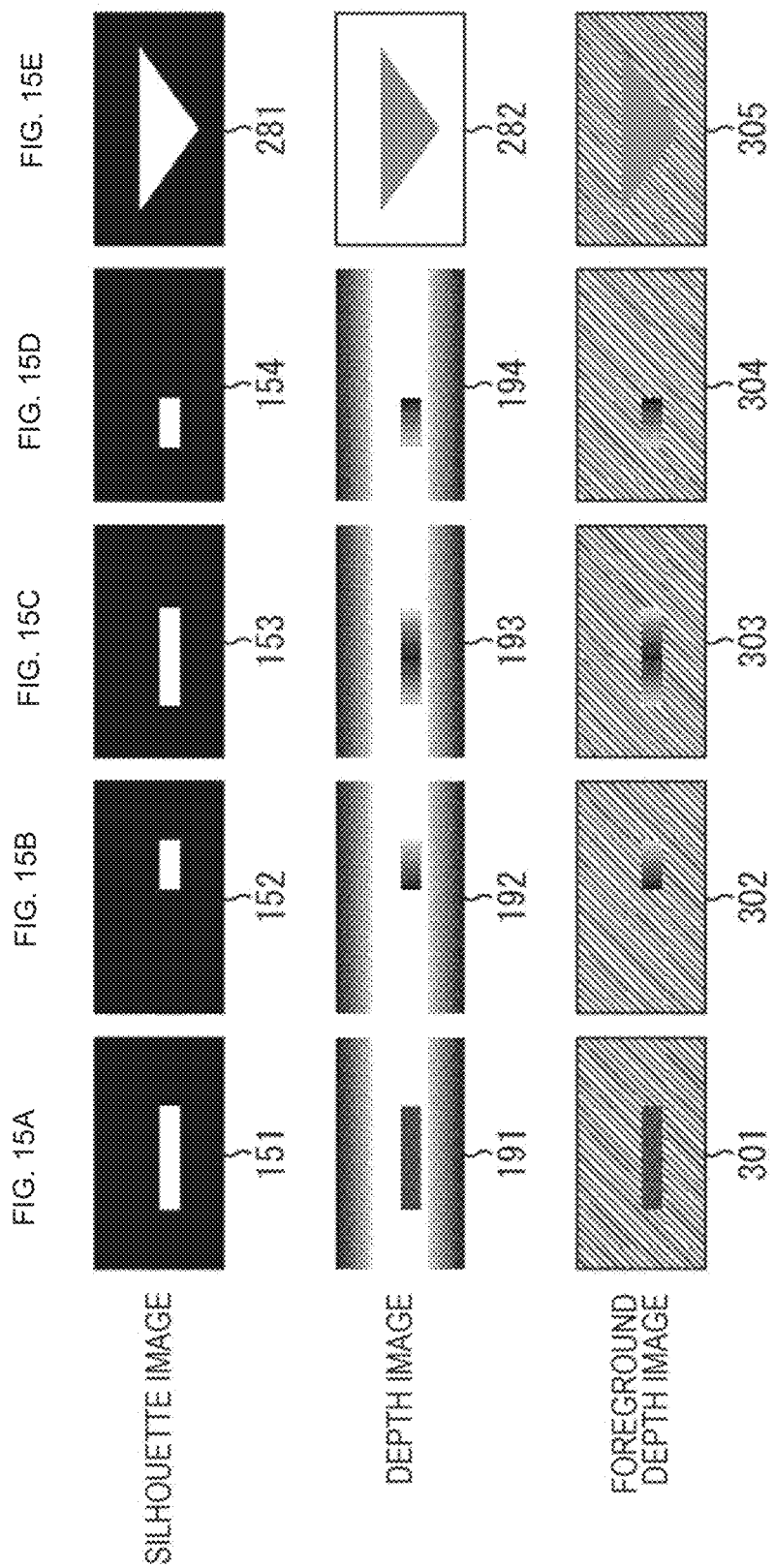
FIGS. 15A, 15B, 15C, 15D, and 15E are diagrams showing example depth images of foregrounds.

FIG. 14 is a block diagram showing an example configuration of the reconstruction unit 33 according to the fourth embodiment of an image processing system to which the present disclosure is applied.

In the configuration shown in FIG. 14, the same components as those shown in FIG. 4 are denoted by the same reference numerals as those used in FIG. 4. The explanations that have already been made will not be repeated.

The reconstruction unit 33 in FIG. 14 includes a foreground depth image generation unit 261, a mesh generation unit 262, a mesh superimposing unit 263, and a 3D data generation unit 104.

The foreground depth image generation unit 261 generates a foreground depth image for each virtual camera, on the basis of depth images that are the luminance components of depth-related images supplied from the decoding unit 32, and silhouette images that are the color components. The foreground depth image generation unit 261 supplies the foreground depth images to the mesh generation unit 262.

For each virtual camera, the mesh generation unit 262 generates one or more polygon meshes forming a 3D model of the foreground, on the basis of the foreground depth images supplied from the foreground depth image generation unit 261 and virtual viewpoint information supplied from the reception unit 31. For each virtual camera, the mesh generation unit 262 supplies shape information about each generated polygon mesh to the mesh superimposing unit 263.

The mesh superimposing unit 263 (the generation unit) superimposes the polygon meshes corresponding to the respective pieces of the shape information about the respective virtual cameras supplied from the mesh generation unit 262. By doing so, the mesh superimposing unit 263 generates the polygon meshes constituting the 3D model of the foreground. The mesh superimposing unit 263 supplies the shape information about the respective polygon meshes of the 3D model of the foreground to the 3D data generation unit 104.

(Example of Foreground Depth Images)

FIGS. 15A, 15B, 15C, 15D, and 15E are diagrams showing an example of foreground depth images generated by the foreground depth image generation unit 261 shown in FIG. 14.

In FIGS. 15A, 15B, 15C, 15D, and 15E, the same components as those shown in FIGS. 6A, 6B, 6C, 6D, 8A, 8B, 8C, and 8D are denoted by the same reference numerals as those used in FIGS. 6A, 6B, 6C, 6D, 8A, 8B, 8C, and 8D. The explanations that have already been made will not be repeated.

In the example shown in FIGS. 15A, 15B, 15C, 15D, and 15E, the viewpoints of the virtual cameras are a total of five viewpoints: the viewpoints A through D shown in FIG. 5 and a viewpoint E taken from the direction (the front side of the drawing in FIG. 5) from which the object 121 is seen in FIG. 5. In this case, the silhouette image of the viewpoint E is a silhouette image 281, and the depth image of the viewpoint E is a depth image 282.

The foreground depth image generation unit 261 extracts the pixel value of the pixel of the depth image 191 of the viewpoint A corresponding to the pixel of the silhouette image 151 of the viewpoint A whose pixel value indicates the foreground region, and sets the extracted pixel value at the pixel value of the foreground depth image 301 corresponding to the pixel. The foreground depth image generation unit 261 also sets the pixel value of the pixel of the foreground depth image 301 corresponding to the pixel of the silhouette image 151 of the viewpoint A whose pixel value indicates the background region, at a particular value indicating the background. In this manner, the foreground depth image generation unit 261 generates the foreground depth image 301.

Likewise, the foreground depth image generation unit 261 generates a foreground depth image 302 from the silhouette image 152 and the depth image 192 of the viewpoint B, and generates a foreground depth image 303 from the silhouette image 153 and the depth image 193 of the viewpoint C. Further, the foreground depth image generation unit 261 generates a foreground depth image 304 from the silhouette image 154 and the depth image 194 of the viewpoint D, and generates a foreground depth image 305 from the silhouette image 281 and the depth image 282 of the viewpoint E. Note that, in FIGS. 15A, 15B, 15C, 15D, and 15E, the region in which the pixel value is the particular value is shaded with diagonal lines.

(Description of the Method of Generating Polygon Meshes)

Figure 16:
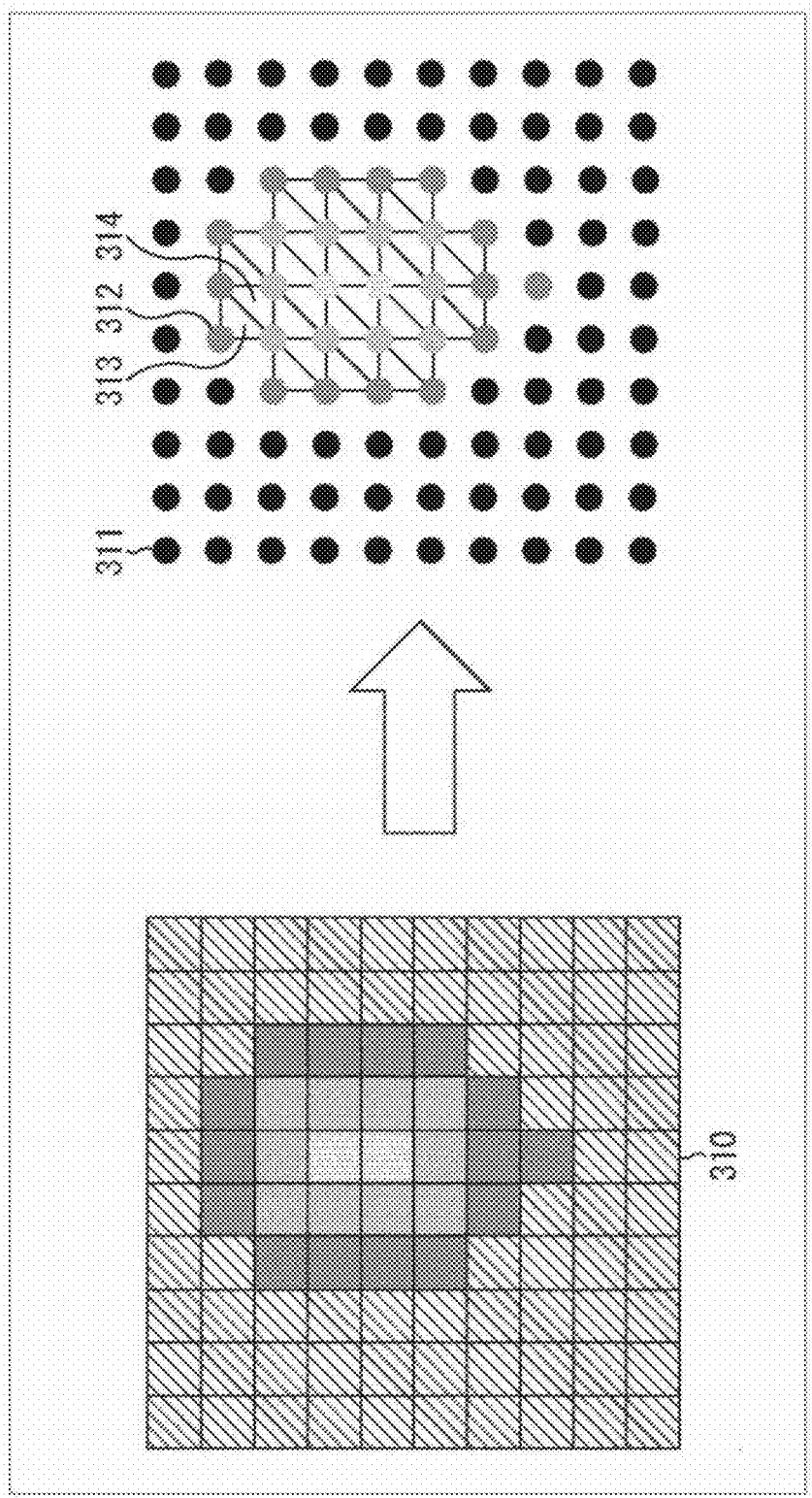
FIG. 16 is a diagram for explaining a method of generating a polygon mesh.

FIG. 16 is a diagram for explaining the method of generating polygon meshes with the mesh generation unit 262 shown in FIG. 14.

In the example shown in FIG. 16, the foreground depth image generation unit 261 generates the depth image 310 of the foreground shown on the left side in FIG. 16 as the depth image of a predetermined viewpoint. In this case, as shown on the right side in FIG. 16, the mesh generation unit 262 arranges dots 311 at predetermined positions (centers) of the respective pixels of the depth image 310 of the foreground, and extracts dots 312 corresponding to the pixels whose pixel values are not the particular value indicating the background region. The mesh generation unit 262 then sequentially sets the extracted dots 312 as the dot to be processed.

For example, in a case where all the three dots 311 located on the right side, the lower side, and the lower right side of the dot to be processed are extracted, the mesh generation unit 262 generates a triangle 313 whose vertices are the dot to be processed and the dots 312 on the right and lower sides of the dot to be processed. The mesh generation unit 262 also generates a triangle 314 whose vertices are the three dots 312 on the right, lower, and lower right sides of the dot to be processed.

The mesh generation unit 262 generates the three-dimensional region corresponding to the triangle 313 as a polygon mesh, on the basis of the positions of the dots 312 forming the respective vertices of the triangle 313 on the foreground depth image 310, the pixel values of the foreground depth image 310 corresponding to the respective dots 312, and the virtual viewpoint information. The mesh generation unit 262 also generates a polygon mesh corresponding to the triangle 314 in a manner similar to the generation of the polygon mesh corresponding to the triangle 313.

After the polygon meshes of the viewpoints A through E are generated in the above manner with the use of the foreground depth images 301 through 305 shown in FIGS. 15A, 15B, 15C, 15D, and 15E, polygon meshes 321 through 325 shown in FIGS. 17A, 17B, 17C, 17D, and 17E are generated.

Figure 17:
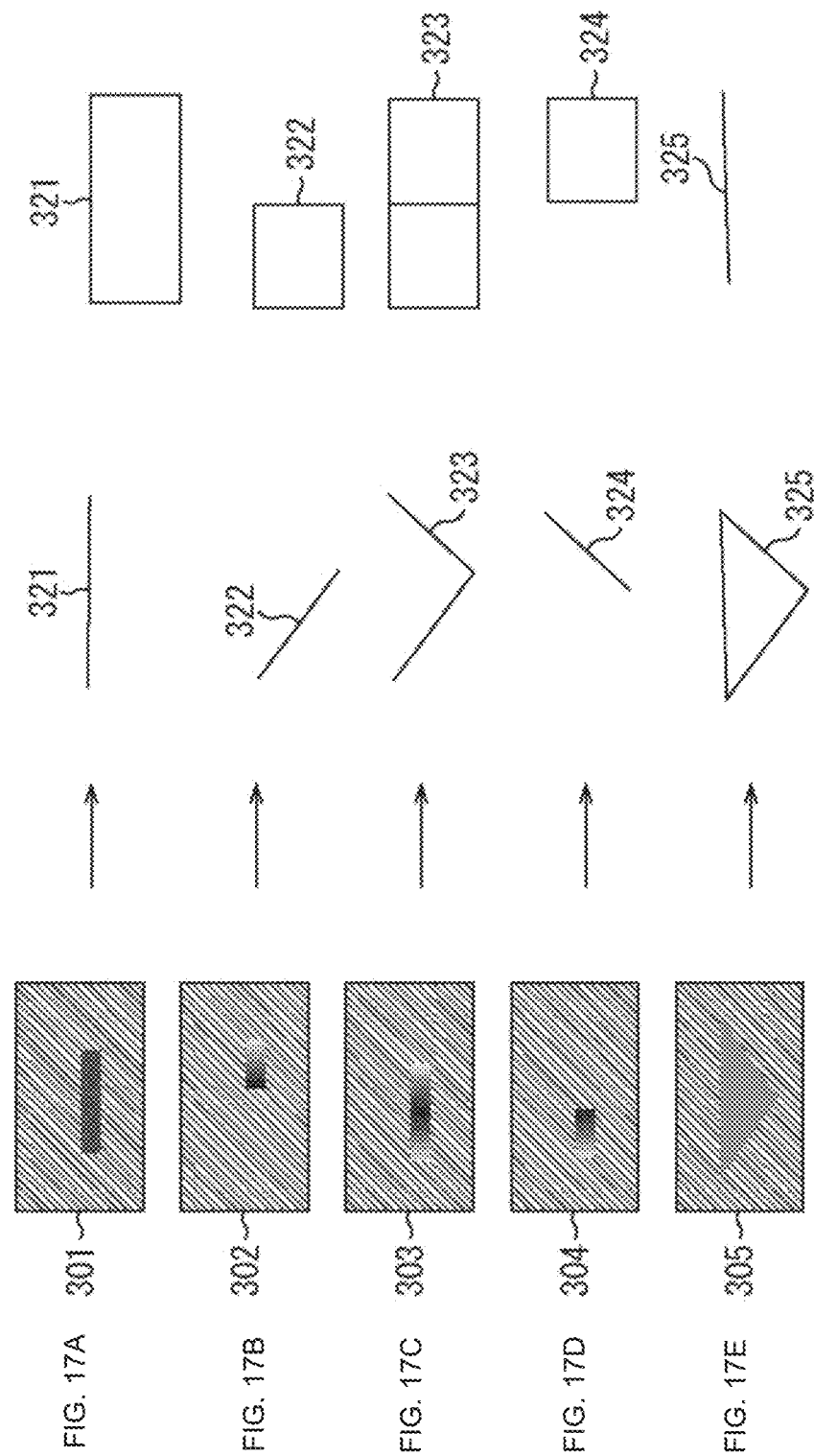
FIGS. 17A, 17B, 17C, 17D, and 17E are diagrams showing examples of polygon meshes.

As shown in FIG. 17A, the shape of the polygon mesh 321 of the viewpoint A as viewed from the viewpoint E is a straight line, and the shape of the polygon mesh 321 as viewed from the viewpoint A is a rectangle. As shown in FIG. 17B, the shape of the polygon mesh 322 of the viewpoint B as viewed from the viewpoint E is a straight ling declining from top left to bottom right, and the shape of the polygon mesh 322 as viewed from the viewpoint B is a rectangle.

Also, as shown in FIG. 17C, the shape of the polygon mesh 323 of the viewpoint C as viewed from the viewpoint E is a line formed by connecting a left-side diagonal line declining from top left to bottom right and a right-side diagonal line rising from bottom left to top right. The shape of the polygon mesh 323 as viewed from the viewpoint C is a rectangle formed by combining two rectangles in the lateral direction. As shown in FIG. 17D, the shape of the polygon mesh 324 of the viewpoint D as viewed from the viewpoint E is a straight ling rising from bottom left to top right, and the shape of the polygon mesh 324 as viewed from the viewpoint D is a rectangle.

Further, as shown in FIG. 17E, the shape of the polygon mesh 325 of the viewpoint E as viewed from the viewpoint E is a triangle, and the shape of the polygon mesh 325 as viewed from the viewpoint A is a straight line.

(Explanation of a Polygon Mesh Superimposing Method)

FIGS. 18A, 18B, 18C, and 18D are diagrams for explaining a method of superimposing polygon meshes of the viewpoints of the respective virtual cameras with the mesh superimposing unit 263 shown in FIG. 14.

In the example shown in FIGS. 18A, 18B, 18C, and 18D, the mesh generation unit 262 generates the polygon meshes 321 through 325 of the viewpoints A through E. FIGS. 18A, 18B, 18C, and 18D show the polygon meshes 321 through 325 as viewed from the viewpoint E.

Figure 18:
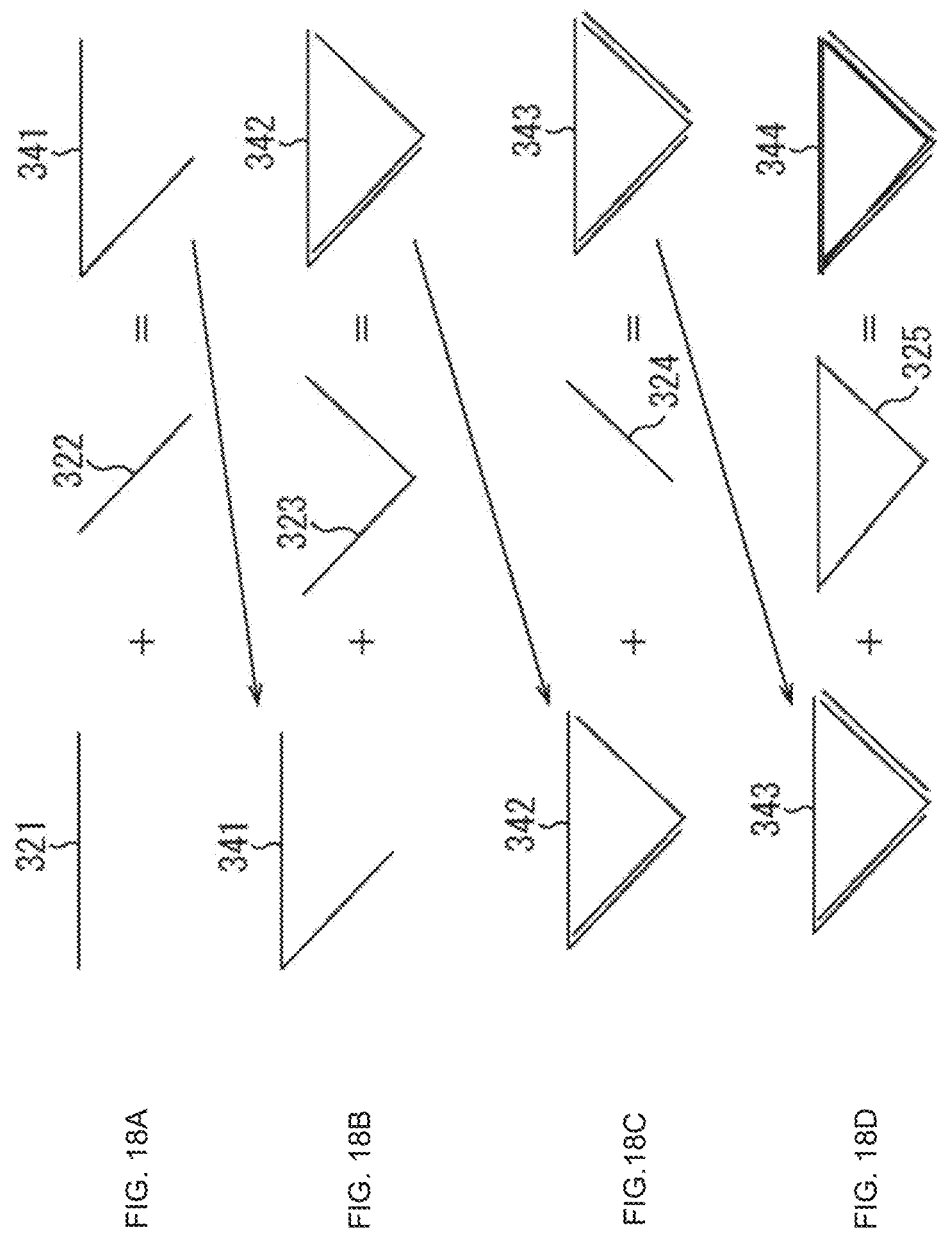
FIGS. 18A, 18B, 18C, and 18D are diagrams for explaining a method of superimposing polygon meshes of viewpoints of respective virtual cameras.

As shown in FIG. 18A, the mesh superimposing unit 263 first superimposes the polygon mesh 321 of the viewpoint A and the polygon mesh 322 of the viewpoint B on each other in the same three-dimensional space, to generate a polygon mesh 341. As shown in FIG. 18B, the mesh superimposing unit 263 then superimposes the polygon mesh 341 and the polygon mesh 323 of the viewpoint C on each other in the same three-dimensional space, to generate a polygon mesh 342.

As shown in FIG. 18C, the mesh superimposing unit 263 then superimposes the polygon mesh 342 and the polygon mesh 324 of the viewpoint D on each other in the same three-dimensional space, to generate a polygon mesh 343. Finally, as shown in FIG. 18D, the mesh superimposing unit 263 superimposes the polygon mesh 343 and the polygon mesh 325 of the viewpoint E on each other in the same three-dimensional space, to generate a polygon mesh 344. The mesh superimposing unit 263 then sets this polygon mesh 344 as the polygon mesh of a 3D model of the foreground.

As described above, the mesh superimposing unit 263 can generate the polygon mesh of a 3D model of the foreground by superposing the polygon meshes 321 through 325 of the viewpoints A through E on one another.

(Description of a Process at the Decoding Apparatus)

Figure 19:
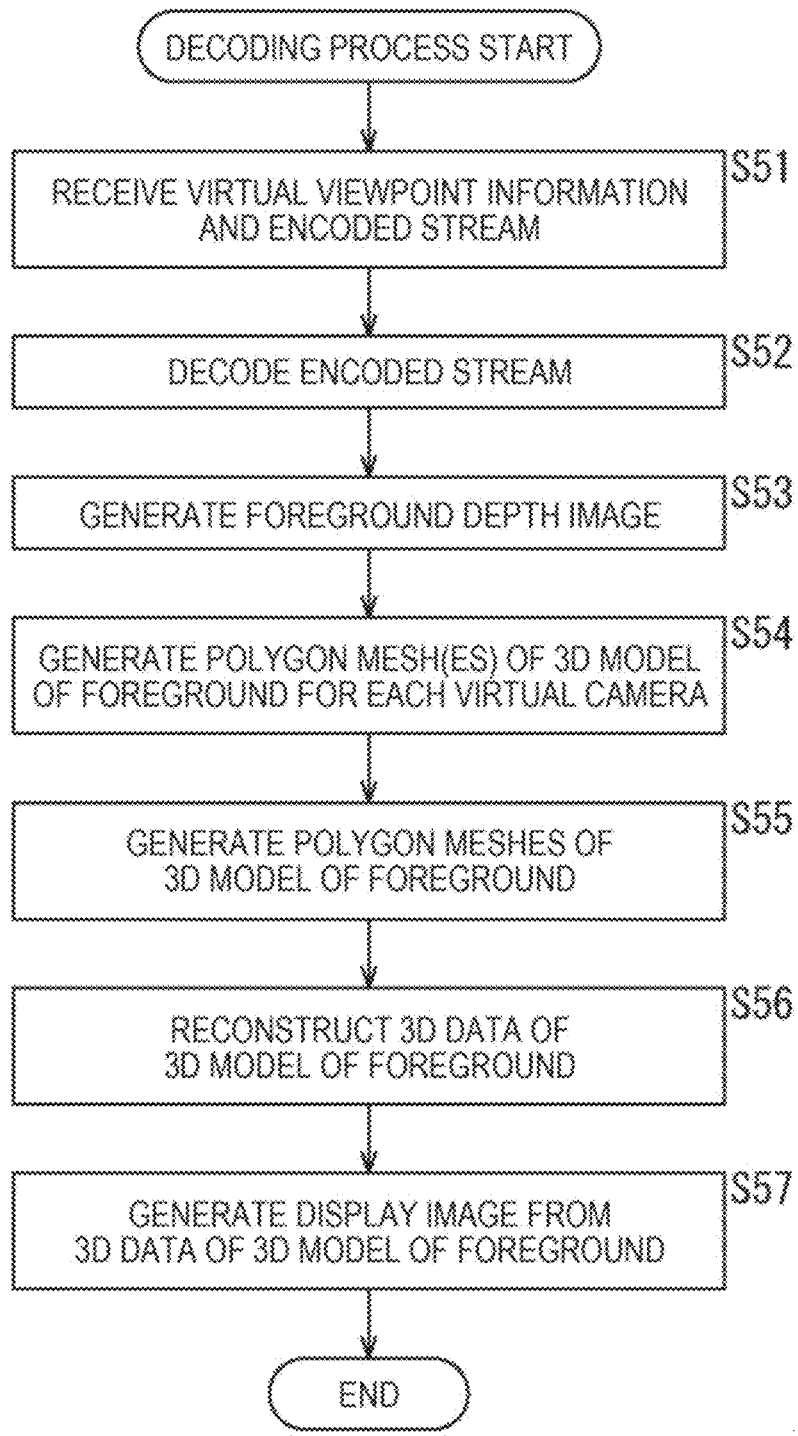
FIG. 19 is a flowchart for explaining a decoding process to be performed by a decoding apparatus according to the fourth embodiment.

FIG. 19 is a flowchart for explaining a decoding process to be performed by the decoding apparatus 13 according to the fourth embodiment. This decoding process is started when an encoded stream and virtual viewpoint information are transmitted frame by frame from the transmission unit 25 of the encoding apparatus 12 of the fourth embodiment, for example.

The processes in steps S51 and S52 in FIG. 19 are similar to the processes in steps S31 and S32 in FIG. 10, and therefore, explanation of them is not repeated herein.

In step S53, the foreground depth image generation unit 261 (FIG. 14) of the reconstruction unit 33 generates a foreground depth image for each virtual camera, on the basis of depth images that are the luminance components of depth-related images supplied from the decoding unit 32, and silhouette images that are the color components. The foreground depth image generation unit 261 supplies the foreground depth images to the mesh generation unit 262.

In step S54, for each virtual camera, the mesh generation unit 262 generates one or more polygon meshes forming a 3D model of the foreground, on the basis of the foreground depth images supplied from the foreground depth image generation unit 261 and virtual viewpoint information supplied from the reception unit 31. For each virtual camera, the mesh generation unit 262 supplies shape information about each generated polygon mesh to the mesh superimposing unit 263.

In step S55, the mesh superimposing unit 263 superimposes the polygon meshes corresponding to the respective pieces of the shape information about the respective virtual cameras supplied from the mesh generation unit 262. By doing so, the mesh superimposing unit 263 generates the polygon meshes constituting the 3D model of the foreground. The mesh superimposing unit 263 supplies the shape information about the respective polygon meshes of the 3D model of the foreground to the 3D data generation unit 104.

The processes in steps S56 and S57 are similar to the processes in steps S36 and S37 in FIG. 10, and therefore, explanation of them is not repeated herein.

Note that each decoding apparatus 13 in the first embodiment and the fourth embodiment may be designed to generate background color images and background depth images of the respective viewpoints, using silhouette images, color images, and depth images. In this case, for the respective virtual cameras, for example, the decoding apparatus 13 performs a blurring process on the background color images so that blurring is more intense when the distance Z is longer, on the basis of the background depth images. The decoding apparatus 13 then generates a background color image of the display viewpoint on the basis of the background color images of the respective virtual cameras after the blurring process, and generates a display image by combining the background color image of the display viewpoint with the foreground color image of the display viewpoint.

Fifth Embodiment (Example Configuration of the Reconstruction Unit)

A fifth embodiment of an image processing system to which the present disclosure is applied differs from the fourth embodiment in that the foreground information is not silhouette images of the respective virtual cameras but foreground depth thresholds for the virtual cameras.

Figure 20:
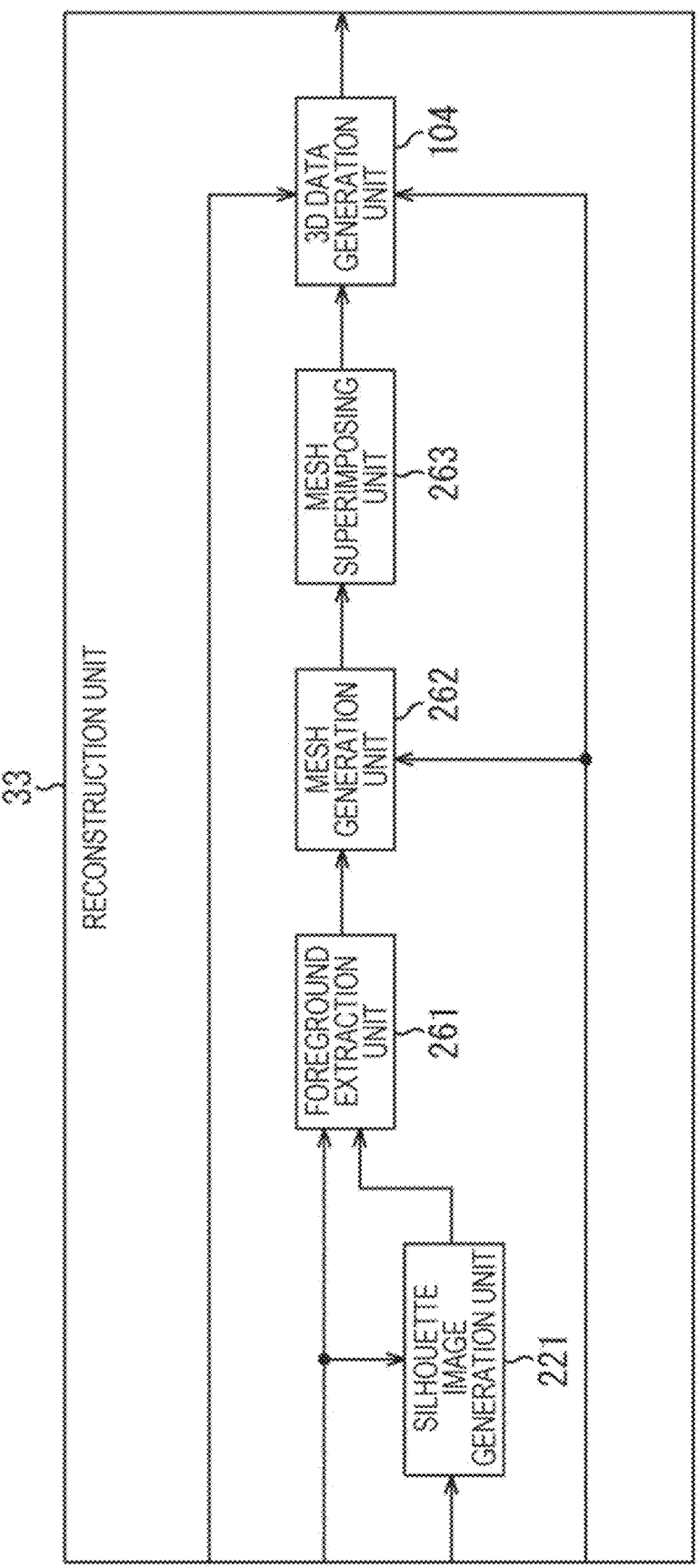
FIG. 20 is a block diagram showing the configuration of a reconstruction unit according to a fifth embodiment of an image processing system to which the present disclosure is applied.

In other words, the fifth embodiment is a combination of the second embodiment and the fourth embodiment. Accordingly, as shown in FIG. 20, the reconstruction unit 33 in the fifth embodiment includes the silhouette image generation unit 221 shown in FIG. 11 at the stage before the foreground depth image generation unit 261 of the reconstruction unit 33 shown in FIG. 14.

Note that each decoding apparatus 13 in the second embodiment and the fifth embodiment may be designed to generate background color images and background depth images of the respective viewpoints, using foreground depth thresholds, color images, and depth images. In this case, for the respective virtual cameras, for example, the decoding apparatus 13 performs a blurring process on the background color images so that blurring is more intense when the distance Z is longer, on the basis of the background depth images. The decoding apparatus 13 then generates a background color image of the display viewpoint on the basis of the background color images of the respective virtual cameras after the blurring process, and generates a display image by combining the background color image of the display viewpoint with the foreground color image of the display viewpoint.

Sixth Embodiment (Example Configuration of the Reconstruction Unit)

A sixth embodiment of an image processing system to which the present disclosure is applied differs from the fourth embodiment in that any foreground information is not transmitted, and a depth-related image is an image that has a depth image of the foreground as the luminance component, and a depth image of the background as the color component.

In other words, the sixth embodiment is a combination of the third embodiment and the fourth embodiment. Specifically, the configuration of the sixth embodiment of an image processing system to which the present disclosure is applied is similar to the configuration of the third embodiment, except for the configuration of the reconstruction unit 33. Therefore, explanation of the components other than the reconstruction unit 33 will not be unnecessarily repeated below.

Figure 21:
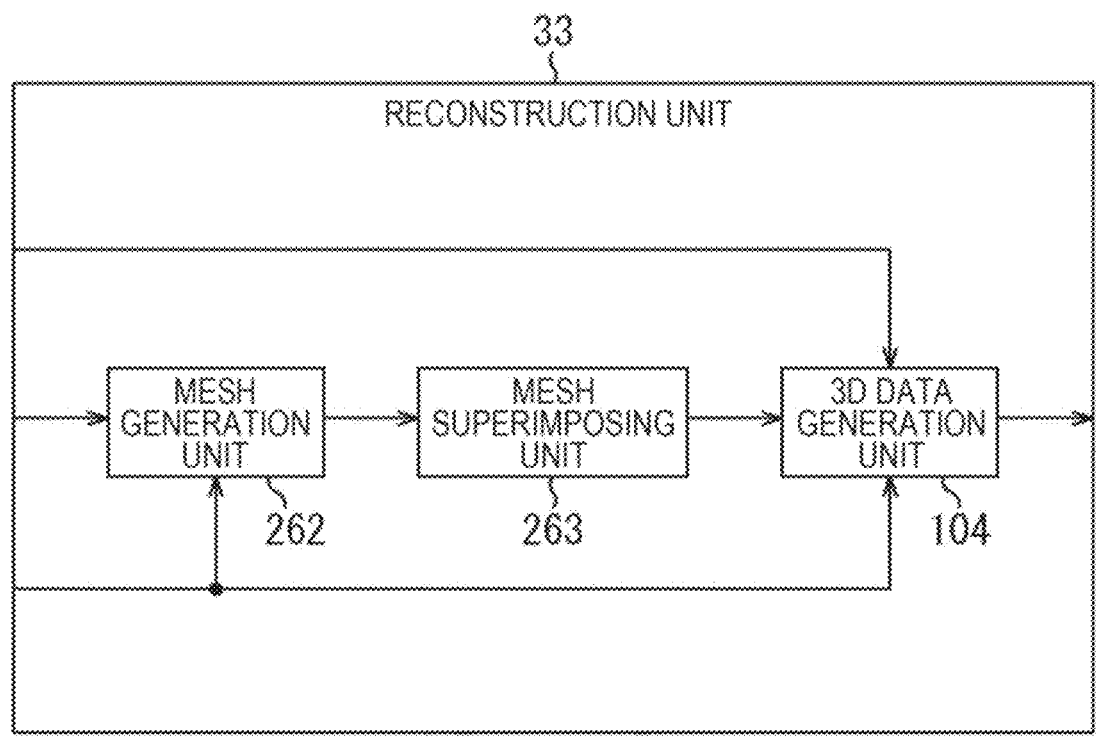
FIG. 21 is a block diagram showing the configuration of a reconstruction unit according to a sixth embodiment of an image processing system to which the present disclosure is applied.

FIG. 21 is a block diagram showing the configuration of the reconstruction unit 33 according to the sixth embodiment of an image processing system to which the present disclosure is applied.

In the configuration shown in FIG. 21, the same components as those shown in FIG. 14 are denoted by the same reference numerals as those used in FIG. 14. The explanations that have already been made will not be repeated.

The reconstruction unit 33 in FIG. 21 differs from the configuration shown in FIG. 14 in that the foreground depth image generation unit 261 is not provided. In other words, in the sixth embodiment, the luminance components of depth-related images are foreground depth images, and therefore, there is no need to generate any foreground depth image. Accordingly, the foreground depth image generation unit 261 is not provided in the reconstruction unit 33 in FIG. 21, and the mesh generation unit 262 generates polygon meshes of a 3D model of the foreground for the respective virtual cameras, on the basis of the foreground depth images as the luminance components of the depth-related images and virtual viewpoint information.

Note that, in the third embodiment and the sixth embodiment, each encoding apparatus 12 transmits an encoded stream of depth-related images including foreground depth images as the luminance components and background depth images as the color components. However, each encoding apparatus 12 may transmit only an encoded stream of foreground depth images.

Further, in the third embodiment and the sixth embodiment, a color image of the entire object may be divided into foreground color images and background color images, and be transmitted from the encoding apparatus 12 to the decoding apparatus 13. In this case, for the respective virtual cameras, for example, the decoding apparatus 13 performs a blurring process on the background color images so that blurring is more intense when the distance Z is longer, on the basis of the background depth images. The decoding apparatus 13 then generates a background color image of the display viewpoint on the basis of the background color images of the respective virtual cameras after the blurring process, and generates a display image by combining the background color image of the display viewpoint with the foreground color image of the display viewpoint.

Seventh Embodiment (Description of a Computer to which the Present Disclosure is Applied)

The above described series of processes can be performed by hardware, or can be performed by software. In a case where the series of processes are to be performed by software, the program that forms the software is installed into a computer. Here, the computer may be a computer incorporated into special-purpose hardware, or may be a general-purpose personal computer or the like that can execute various kinds of functions, having various kinds of programs installed thereinto, for example.

Figure 22:
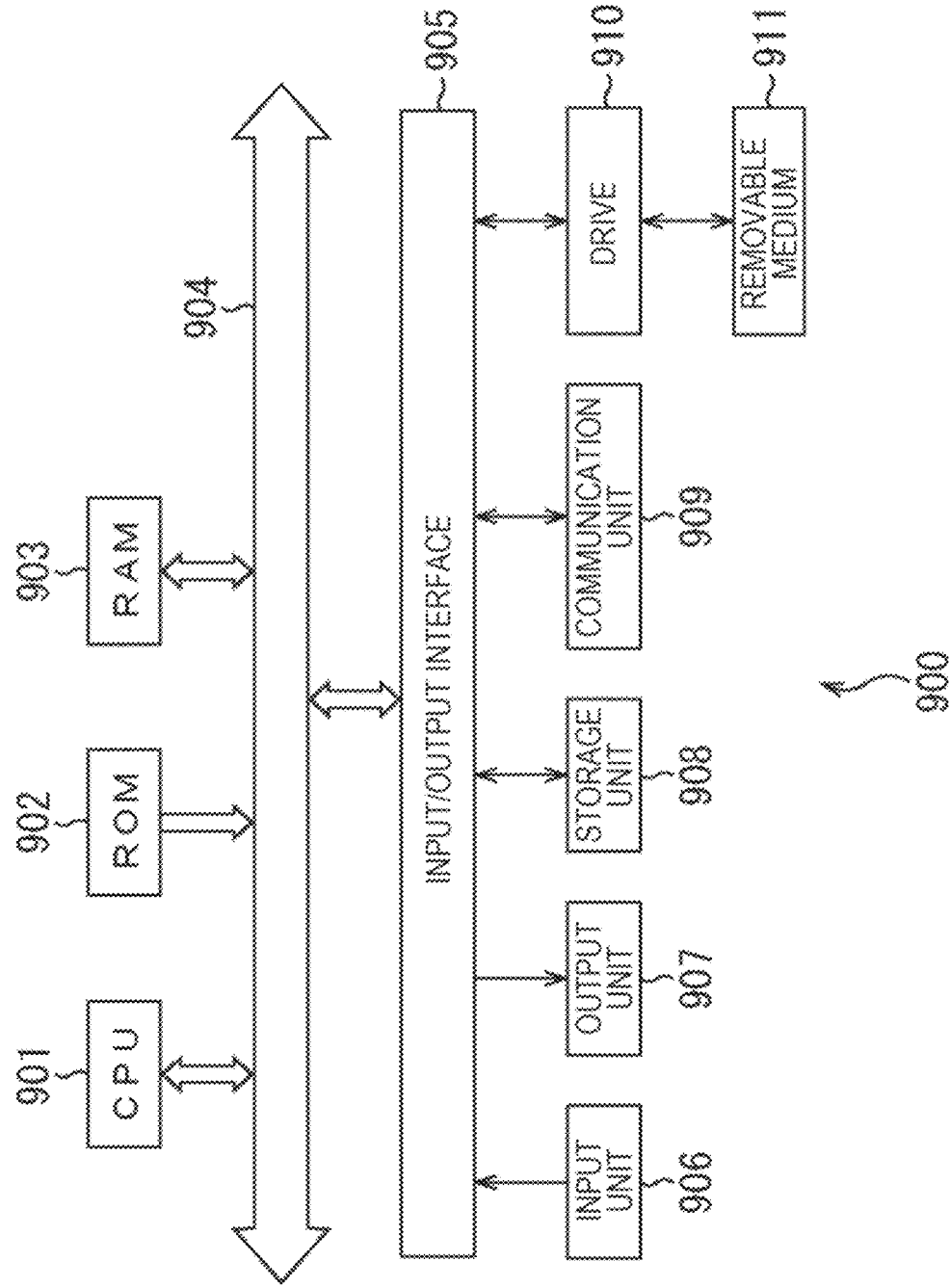
FIG. 22 is a block diagram showing an example configuration of the hardware of a computer.

FIG. 22 is a block diagram showing an example configuration of the hardware of a computer that performs the above described series of processes in accordance with a program.

In a computer 900, a central processing unit (CPU) 901, a read only memory (ROM) 902, and a random access memory (RAM) 903 are connected to one another by a bus 904.

An input/output interface 905 is further connected to the bus 904. An input unit 906, an output unit 907, a storage unit 908, a communication unit 909, and a drive 910 are connected to the input/output interface 905.

The input unit 906 is formed with a keyboard, a mouse, a microphone, and the like. The output unit 907 is formed with a display, a speaker, and the like. The storage unit 908 is formed with a hard disk, a nonvolatile memory, or the like. The communication unit 909 is formed with a network interface or the like. The drive 910 drives a removable medium 911, such as a magnetic disk, an optical disk, a magnetooptical disk, or a semiconductor memory.

In the computer 900 having the above described configuration, the CPU 901 loads a program stored in the storage unit 908 into the RAM 903 via the input/output interface 905 and the bus 904, for example, and executes the program, so that the above described series of processes are performed.

For example, the program to be executed by the computer 900 (CPU 901) can be recorded in the removable medium 911 as a packaged medium or the like to be provided. Alternatively, the program can be provided via a wired or wireless transmission medium, such as a local area network, the Internet, or digital satellite broadcasting.

In the computer 900, the program can be installed into the storage unit 908 via the input/output interface 905 when the removable medium 911 is mounted on the drive 910. Alternatively, the program may be received by the communication unit 909 through a wired or wireless transmission medium, and be installed into the storage unit 908. Other than the above, the program may be installed beforehand into the ROM 902 or the storage unit 908.

It should be noted that the program to be executed by the computer 900 may be a program for performing processes in chronological order in accordance with the sequence described in this specification, or may be a program for performing processes in parallel or performing a process when necessary, such as when there is a call.

Example Applications

The technology according to the present disclosure can be applied to various products. For example, the technology according to the present disclosure may be embodied as an apparatus mounted on any type of moving object, such as an automobile, an electrical vehicle, a hybrid electrical vehicle, a motorcycle, a bicycle, a personal mobility device, an airplane, a drone, a vessel, a robot, a construction machine, or an agricultural machine (a tractor).

FIG. 23 is a block diagram schematically showing an example configuration of a vehicle control system 7000 that is an example of a moving object control system to which the technology according to the present disclosure can be applied. The vehicle control system 7000 includes a plurality of electronic control units connected via a communication network 7010. In the example shown in FIG. 23, the vehicle control system 7000 includes a drive system control unit 7100, a body system control unit 7200, a battery control unit 7300, an external information detection unit 7400, an in-vehicle information detection unit 7500, and an overall control unit 7600. The communication network 7010 connecting the plurality of control units may be an in-vehicle communication network compliant with an appropriate standard, such as a controller area network (CAN), a local interconnect network (LIN), a local area network (LAN), or FlexRay (registered trademark), for example.

Each of the control units includes: a microcomputer that performs arithmetic processing according to various programs; a storage unit that stores the programs to be executed by the microcomputer, the parameters to be used for various calculations, or the like; and a drive circuit that drives the current device to be subjected to various kinds of control. Each of the control units includes a communication interface for performing communication through wired communication or wireless communication with an external device or a sensor or the like, as well as a network interface for communicating with another control unit via the communication network 7010. In FIG. 23, a microcomputer 7610, a general-purpose communication interface 7620, a dedicated communication interface 7630, a positioning unit 7640, a beacon reception unit 7650, an in-vehicle device interface 7660, a sound/image output unit 7670, an in-vehicle network interface 7680, and a storage unit 7690 are shown as the functional components of the overall control unit 7600. Likewise, the other control units each include a microcomputer, a communication interface, a storage unit, and the like.

The drive system control unit 7100 controls operations of the devices related to the drive system of the vehicle according to various programs. For example, the drive system control unit 7100 functions as control devices such as a driving force generation device for generating a driving force of the vehicle such as an internal combustion engine or a driving motor, a driving force transmission mechanism for transmitting the driving force to the wheels, a steering mechanism for adjusting the steering angle of the vehicle, and a braking device for generating a braking force of the vehicle. The drive system control unit 7100 may also have functions as a control device such as an antilock brake system (ABS) or an electronic stability controller (ESC).

A vehicle state detector 7110 is connected to the drive system control unit 7100. For example, the vehicle state detector 7110 includes at least one of the following components: a gyro sensor that detects an angular velocity of axial rotation motion of the vehicle body; an acceleration sensor that detects an acceleration of the vehicle; and a sensor for detecting an operation amount of the gas pedal, an operation amount of the brake pedal, an steering angle of the steering wheel, an engine rotation speed, a wheel rotation speed, or the like. The drive system control unit 7100 performs arithmetic processing using a signal input from the vehicle state detector 7110, and controls the internal combustion engine, the driving motor, the electrical power steering device, the brake device, or the like.

The body system control unit 7200 controls operations of the various devices mounted on the vehicle body according to various programs. For example, the body system control unit 7200 functions as a keyless entry system, a smart key system, a power window device, or a control device for various lamps such as a headlamp, a backup lamp, a brake lamp, a turn signal lamp, or a fog lamp. In this case, the body system control unit 7200 can receive radio waves transmitted from a portable device that substitutes for a key, or signals from various switches. The body system control unit 7200 receives inputs of these radio waves or signals, and controls the door lock device, the power window device, the lamps, and the like of the vehicle.

The battery control unit 7300 controls a secondary battery 7310 that is a power supply source for the driving motor, according to various programs. For example, the battery control unit 7300 receives information, such as a battery temperature, a battery output voltage, or a remaining capacity of the battery, from a battery device including the secondary battery 7310. The battery control unit 7300 performs arithmetic processing using these signals, to control temperature adjustment of the secondary battery 7310 or to control a cooling device or the like provided in the battery device.

The external information detection unit 7400 detects information outside the vehicle equipped with the vehicle control system 7000. For example, an imaging unit 7410 and/or an external information detector 7420 is connected to the external information detection unit 7400. The imaging unit 7410 includes at least one of the following cameras: a time-of-flight (ToF)) camera, a stereo camera, a monocular camera, an infrared camera, or other cameras. The external information detector 7420 includes an environment sensor for detecting the current weather or meteorological phenomenon, and/or an ambient information detection sensor for detecting another vehicle, an obstacle, a pedestrian, or the like around the vehicle equipped with the vehicle control system 7000, for example.

The environment sensor may be formed with at least one of the following sensors: a raindrop sensor that detects rain, a fog sensor that detects a fog, a solar radiation sensor that detects a degree of solar radiation, or a snow sensor that detects a snowfall, for example. The ambient information detection sensor may be at least one of the following devices: an ultrasonic sensor, a radar device, and a LIDAR (light detection and ranging, laser imaging detection and ranging) device. The imaging unit 7410 and the external information detector 7420 may be provided as an independent device and an independent sensor, respectively, or may be provided as a device in which a plurality of sensors or devices are integrated.

Here, FIG. 24 shows an example of installation positions of imaging units 7410 and external information detectors 7420. Imaging units 7910, 7912, 7914, 7916, and 7918 are provided at at least one of the following positions: the front end edge of a vehicle 7900, a side mirror, the rear bumper, a rear door, and an upper portion of the front windshield inside the vehicle, for example. The imaging unit 7910 provided on the front end edge and the imaging unit 7918 provided on the upper portion of the front windshield inside the vehicle mainly capture images ahead of the vehicle 7900. The imaging units 7912 and 7914 provided on the side mirrors mainly capture images on the sides of the vehicle 7900. The imaging unit 7916 provided on the rear bumper or a rear door mainly captures images behind the vehicle 7900. The imaging unit 7918 provided on the upper portion of the front windshield inside the vehicle is mainly used for detection of a vehicle running in front of the vehicle, a pedestrian, an obstacle, a traffic signal, a traffic sign, a lane, or the like.

Note that FIG. 24 shows an example of the imaging range of each of the imaging units 7910, 7912, 7914, and 7916. An imaging range a indicates the imaging range of the imaging unit 7910 provided on the front end edge, imaging ranges b and c indicate the imaging ranges of the imaging units 7912 and 7914 provided on the respective side mirrors, and an imaging range d indicates the imaging range of the imaging unit 7916 provided on the rear bumper or a rear door. For example, image data captured by the imaging units 7910, 7912, 7914, and 7916 are superimposed on one another, so that an overhead image of the vehicle 7900 viewed from above is obtained.

External information detectors 7920, 7922, 7924, 7926, 7928, and 7930 provided on the front, the rear, the sides, the corners of the vehicle 7900 and an upper portion of the front windshield inside the vehicle may be ultrasonic sensors or radar devices, for example. The external information detectors 7920, 7926, and 7930 provided on the front end edge of the vehicle 7900, the rear bumper, and the rear doors, and the upper portion of the front windshield inside the vehicle may be LIDAR devices, for example. These external information detectors 7920 through 7930 are mainly used for detecting a vehicle running in front of the vehicle, a pedestrian, an obstacle, or the like.

Referring back to FIG. 23, the explanation is continued. The external information detection unit 7400 causes the imaging unit 7410 to capture an image of the outside of the vehicle, and receives the captured image data. The external information detection unit 7400 also receives detection information from the external information detector 7420 connected thereto. In a case where the external information detector 7420 is an ultrasonic sensor, a radar device, or an LIDAR device, the external information detection unit 7400 causes the external information detector 7420 to transmit ultrasonic waves, or electromagnetic waves, or the like, and receive information about received reflected waves. On the basis of the received information, the external information detection unit 7400 may perform an object detection process for detecting a person, a vehicle, an obstacle, a sign, characters on the road surface, or the like, or perform a distance detection process. On the basis of the received information, the external information detection unit 7400 may also perform an environment recognition process for recognizing a rainfall, a fog, a road surface condition, or the like. On the basis of the received information, the external information detection unit 7400 may also calculate the distance to an object outside the vehicle.

Further, on the basis of the received image data, the external information detection unit 7400 may perform an image recognition process for recognizing a person, a vehicle, an obstacle, a sign, characters on the road surface, or the like, or a distance detection process. The external information detection unit 7400 may also perform processing such as distortion correction or positioning on the received image data, and combine the image data captured by different imaging units 7410, to generate an overhead image or a panoramic image. The external information detection unit 7400 may also perform a viewpoint conversion process using image data captured by different imaging units 7410.

The in-vehicle information detection unit 7500 detects information about the inside of the vehicle. For example, a driver state detector 7510 that detects the state of the driver is connected to the in-vehicle information detection unit 7500. The driver state detector 7510 may include a camera that captures images of the driver, a biometric sensor that detects biological information about the driver, a microphone that collects sounds inside the vehicle, or the like. The biometric sensor is provided on the seating surface or the steering wheel or the like, for example, and detects biological information about a passenger sitting on a seat or the driver holding the steering wheel. On the basis of the detection information input from the driver state detector 7510, the in-vehicle information detection unit 7500 may calculate the degree of fatigue or the degree of concentration of the driver, or determine whether the driver is dozing off. The in-vehicle information detection unit 7500 may also perform a noise cancel process or the like on the collected sound signals.

The overall control unit 7600 controls the entire operation in the vehicle control system 7000 according to various programs. An input unit 7800 is connected to the overall control unit 7600. The input unit 7800 is formed with a device on which a passenger can perform an input operation, such as a touch panel, buttons, a microphone, a switch, or a lever, for example. The overall control unit 7600 may receive data obtained by performing speech recognition on the sound input by a microphone. For example, the input unit 7800 may be a remote control device using infrared rays or some other radio waves, or an external connection device such as a portable telephone or a personal digital assistant (PDA) compatible with operations on the vehicle control system 7000. The input unit 7800 may be a camera, for example, and in that case, a passenger can input information by gesture. Alternatively, data obtained by detecting movement of a wearable device worn by a passenger may be input. Further, the input unit 7800 may include an input control circuit or the like that generates an input signal on the basis of information input by a passenger or the like using the above input unit 7800, for example, and outputs the input signal to the overall control unit 7600. By operating this input unit 7800, a passenger or the like inputs various data to the vehicle control system 7000 or issues a processing operation instruction to the vehicle control system 7000.

The storage unit 7690 may include a read only memory (ROM) that stores various programs to be executed by the microcomputer, and a random access memory (RAM) that stores various parameters, calculation results, sensor values, and the like. Also, the storage unit 7690 may be formed with a magnetic storage device such as a hard disk drive (HDD), a semiconductor storage device, an optical storage device, a magneto-optical storage device, or the like.

The general-purpose communication interface 7620 is a general communication interface that mediates communication with various devices existing in external environments 7750. The general-purpose communication interface 7620 may implement a cellular communication protocol such as GSM (Global System of Mobile communications), WiMAX, LTE (Long Term Evolution), or LTE-A (LTE-Advanced), or some other wireless communication protocol such as wireless LAN (also called Wi-Fi (registered trademark)) or Bluetooth (registered trademark). The general-purpose communication interface 7620 may be connected to a device (an application server or a control server, for example) existing in an external network (the Internet, a cloud network, or a company-specific network, for example) via a base station or an access point. Alternatively, the general-purpose communication interface 7620 may be connected to a terminal (a terminal of a driver, a pedestrian, or a shop, or a machine type communication (MTC) terminal, for example) existing in the vicinity of the vehicle, using the peer-to-peer (P2P) technology.

The dedicated communication interface 7630 is a communication interface that supports a communication protocol formulated for use in a vehicle. The dedicated communication interface 7630 may implement a standard protocol such as Wireless Access in Vehicle Environment (WAVE), which is a combination of IEEE802.11p as the lower layer and IEEE1609 as the upper layer, Dedicated Short Range Communications (DSRC), or a cellular communication protocol, for example. Typically, the dedicated communication interface 7630 conducts V2X (Vehicle to Vehicle) communication, which is a concept including at least one of the following kinds of communication: vehicle-to-vehicle communication, vehicle-to-infrastructure communication, vehicle-to-home communication, and vehicle-to-pedestrian communication.

The positioning unit 7640 receives a GNSS signal (a GPS signal from a global positioning system (GPS) satellite, for example) from a global navigation satellite system (GNSS) satellite, performs positioning, and generates location information including the latitude, the longitude, and the altitude of the vehicle. Note that the positioning unit 7640 may identify the current location by exchanging signals with a wireless access point, or may acquire the location information from a terminal having a positioning function, such as a portable telephone, a PHS, or a smartphone.

The beacon reception unit 7650 receives radio waves or electromagnetic waves transmitted from a radio station or the like installed on a road, for example, and acquires information about the current location, traffic congestion, closing of a road, a required time, or the like. Note that the functions of the beacon reception unit 7650 may be included in the dedicated communication interface 7630 described above.

The in-vehicle device interface 7660 is a communication interface that mediates connection between the microcomputer 7610 and various in-vehicle devices 7760 existing in the vehicle. The in-vehicle device interface 7660 may establish a wireless connection, using a wireless communication protocol such as wireless LAN, Bluetooth (registered trademark), Near Field Communication (NFC), or wireless USB (WUSB). Further, the in-vehicle device interface 7660 may establish a wired connection to a universal serial bus (USB), a high-definition multimedia interface (HDMI), a mobile high-definition link (MHL), or the like via a connecting terminal (not shown) (and a cable, if necessary). The in-vehicle devices 7760 may include a mobile device or a wearable device owned by a passenger, and/or an information device installed in or attached to the vehicle, for example. The in-vehicle devices 7760 may also include a navigation device that searches for a route to a desired destination. The in-vehicle device interface 7660 exchanges control signals or data signals with these in-vehicle devices 7760.

The in-vehicle network interface 7680 is an interface that mediates communication between the microcomputer 7610 and the communication network 7010. The in-vehicle network interface 7680 transmits and receives signals and the like, according to a predetermined protocol supported by the communication network 7010.

The microcomputer 7610 of the overall control unit 7600 controls the vehicle control system 7000 according to various programs, following information acquired via at least one of the following components: the general-purpose communication interface 7620, the dedicated communication interface 7630, the positioning unit 7640, the beacon reception unit 7650, the in-vehicle device interface 7660, and the in-vehicle network interface 7680. For example, on the basis of acquired external and internal information, the microcomputer 7610 may calculate the control target value of the driving force generation device, the steering mechanism, or the braking device, and output a control command to the drive system control unit 7100. For example, the microcomputer 7610 may perform cooperative control to achieve the functions of an advanced driver assistance system (ADAS), including vehicle collision avoidance or impact mitigation, follow-up running based on the distance between vehicles, vehicle speed maintenance running, vehicle collision warning, vehicle lane deviation warning, or the like. The microcomputer 7610 may also perform cooperative control to conduct automatic driving or the like for autonomously running not depending on the operation of the driver, by controlling the driving force generation device, the steering mechanism, the braking device, or the like on the basis of acquired information about the surroundings of the vehicle.

The microcomputer 7610 may generate information about the three-dimensional distance between the vehicle and an object such as a nearby architectural structure or a person, and create local map information including surroundings information about the current location of the vehicle, on the basis of information acquired via at least one of the following components: the general-purpose communication interface 7620, the dedicated communication interface 7630, the positioning unit 7640, the beacon reception unit 7650, the in-vehicle device interface 7660, and the in-vehicle network interface 7680. The microcomputer 7610 may also generate a warning signal by predicting danger such as a collision of the vehicle, an approach of a pedestrian or the like, or entry to a closed road, on the basis of acquired information. The warning signal may be a signal for generating an alarm sound or for turning on a warning lamp, for example.

The sound/image output unit 7670 transmits an audio output signal and/or an image output signal to an output device that is capable of visually or audibly notifying the passenger(s) of the vehicle or the outside of the vehicle of information. In the example shown in FIG. 23, an audio speaker 7710, a display unit 7720, and an instrument panel 7730 are shown as output devices. The display unit 7720 may include an on-board display and/or a head-up display, for example. The display unit 7720 may have an augmented reality (AR) display function. An output device may be some device other than the above devices, such as a wearable device like a headphone or an eyeglass-type display to be worn by a passenger, a projector, or a lamp. In a case where the output device is a display device, the display device visually displays results obtained through various processes performed by the microcomputer 7610, or information received from other control units, in various forms such as text, an image, a table, or a graph. Moreover, in a case where the output device is a sound output device, the sound output device audibly outputs an analog signal by converting reproduced sound data or an audio signal formed with acoustic data and the like into the analog signal.

Note that, in the example shown in FIG. 23, at least two control units connected via the communication network 7010 may be integrated into one control unit. Alternatively, each control unit may be formed with a plurality of control units. Further, the vehicle control system 7000 may include another control unit that is not shown in the drawing. Also, in the above description, some or all of the functions of one of the control units may be provided by some other control unit. That is, as long as information is transmitted and received via the communication network 7010, predetermined arithmetic processing may be performed by any control unit. Likewise, a sensor or a device connected to any control unit may be connected to another control unit, and a plurality of control units may transmit and receive detection information to and from one another via the communication network 7010.

Furthermore, a computer program for achieving the respective functions of an image processing system 10 according to any of the embodiments described above with reference to FIGS. 1, 2, 3, 4, 5, 6A, 6B, 6C, 6D, 7, 8A, 8B, 8C, 8D, 9A, 9B, 9C, 9D, 10, 11, 12, 13, 14, 15A, 15B, 150, 15D, 15E, 16, 17A, 17B, 170, 17D, 17E, 18A, 18B, 18C, 18D, 19, 20, and 21 can be implemented in any of the control units or the like. It is also possible to provide a computer readable recording medium in which such a computer program is stored. The recording medium is a magnetic disk, an optical disk, a magnetooptical disk, a flash memory, or the like, for example. Further, the above computer program may be delivered via a network, for example, without the use of any recording medium.

In the vehicle control system 7000 described above, an image processing system 10 according to any of the embodiments described with reference to FIGS. 1, 2, 3, 4, 5, 6A, 6B, 6C, 6D, 7, 8A, 8B, 8C, 8D, 9A, 9B, 9C, 9D, 10, 11, 12, 13, 14, 15A, 15B, 15C, 15D, 15E, 16, 17A, 17B, 17C, 17D, 17E, 18A, 18B, 18C, 18D, 19, 20, and 21 can be applied to the vehicle control system 7000 of the example application shown in FIG. 23. For example, the imaging apparatus 11 of the image processing system 10 is equivalent to the imaging unit 7410, the encoding apparatus 12 and the decoding apparatus 13 are integrated and are equivalent to the overall control unit 7600, and the display device 14 is equivalent to the display unit 7720. With this configuration, the overall control unit 7600 can generate only a 3D model of the foreground.

Further, at least a part of the components of any image processing system 10 described with reference to FIGS. 1, 2, 3, 4, 5, 6A, 6B, 6C, 6D, 7, 8A, 8B, 8C, 8D, 9A, 9B, 90, 9D, 10, 11, 12, 13, 14, 15A, 15B, 150, 15D, 15E, 16, 17A, 17B, 170, 17D, 17E, 18A, 18B, 18C, 18D, 19, 20, and 21 may be formed in a module (an integrated circuit module formed with one die, for example) for the overall control unit 7600 shown in FIG. 23. Alternatively, any image processing system 10 described with reference to FIGS. 1, 2, 3, 4, 5, 6A, 6B, 6C, 6D, 7, 8A, 8B, 8C, 8D, 9A, 9B, 9C, 9D, 10, 11, 12, 13, 14, 15A, 15B, 150, 15D, 15E, 16, 17A, 17B, 170, 17D, 17E, 18A, 18B, 180, 18D, 19, 20, and 21 may be formed with the plurality of control units of the vehicle control system 7000 shown in FIG. 23.

In this specification, a system means an assembly of a plurality of components (devices, modules (parts), and the like), and not all the components need to be provided in the same housing. In view of this, a plurality of devices that are housed in different housings and are connected to one another via a network form a system, and one device having a plurality of modules housed in one housing is also a system.

Note that the advantageous effects described in this specification are merely examples, and the advantageous effects of the present technology are not limited to them and may include other effects.

Also, embodiments of the present disclosure are not limited to the above described embodiments, and various modifications may be made to them within the scope of the present disclosure.

For example, the present disclosure can be embodied in a cloud computing configuration in which one function is shared among devices via a network, and processing is performed by the plurality of devices cooperating with one another.

Further, the respective steps described with reference to the above described flowcharts can be carried out by one device or can be shared among a plurality of devices.

Furthermore, in a case where more than one process is included in one step, the plurality of processes included in the step can be performed by one device or can be shared among a plurality of devices.

Note that the present disclosure may also be embodied in the configurations described below.

(1)

An image processing apparatus including a 3D model generation unit that generates a 3D model of a foreground, on the basis of depth images of a plurality of viewpoints and foreground images of the plurality of viewpoints.

(2)

The image processing apparatus according to (1), in which the foreground images are silhouette images showing silhouettes of the foreground.

(3)

The image processing apparatus according to (1) or (2), further including a reception unit that receives depth-related images of the plurality of viewpoints, in which the depth-related images are images having the depth images as luminance components and the foreground images as color components, and the 3D model generation unit generates the 3D model of the foreground, on the basis of the depth-related images of the plurality of viewpoints received by the reception unit.

(4)

The image processing apparatus according to (1) or (2), further including an image generation unit that generates the foreground images for the respective viewpoints, on the basis of a threshold for a pixel value of the foreground in the depth images, and the depth images.

(5)

The image processing apparatus according to (4), further including a reception unit that receives the depth images of the plurality of viewpoints and the threshold.

(6)

The image processing apparatus according to any one of (1) to (5), in which the 3D model generation unit includes:

a visual hull generation unit that generates a visual hull on the basis of the foreground images of the plurality of viewpoints; and a correction unit that generates the 3D model of the foreground by correcting the visual hull generated by the visual hull generation unit, on the basis of the depth images of the plurality of viewpoints.

(7)

The image processing apparatus according to any one of (1) to (5), in which the 3D model generation unit includes:

a foreground depth image generation unit that generates foreground depth images for the respective viewpoints, on the basis of the depth images and the foreground images; and a generation unit that generates the 3D model of the foreground, on the basis of the foreground depth images generated by the foreground depth image generation unit.

(8)

An image processing method implemented by an image processing apparatus, the image processing method including a 3D model generation step of generating a 3D model of a foreground, on the basis of depth images of a plurality of viewpoints and foreground images of the plurality of viewpoints.

(9)

An image processing apparatus including a transmission unit that transmits depth images of a plurality of viewpoints and foreground information about a foreground of the plurality of viewpoints.

(10)

The image processing apparatus according to (9), in which the foreground information is silhouette images showing silhouettes of the foreground.

(11)

The image processing apparatus according to (10), in which the transmission unit transmits depth-related images of the plurality of viewpoints, and the depth-related images are images having the depth images as luminance components and the foreground information as color components.

(12)

The image processing apparatus according to (9), in which the foreground information is a threshold for a pixel value of the foreground in the depth images.

(13)

An image processing method implemented by an image processing apparatus, the image processing method including a transmission step of transmitting depth images of a plurality of viewpoints and foreground information about a foreground of the plurality of viewpoints.

(14)

An image processing apparatus including a 3D model generation unit that generates a 3D model of a foreground, on the basis of foreground depth images of a plurality of viewpoints.

(15)

The image processing apparatus according to (14), further including a reception unit that receives depth-related images of the plurality of viewpoints, in which the depth-related images are images having the foreground depth images as luminance components and background depth images as color components, and the 3D model generation unit generates the 3D model of the foreground, on the basis of the luminance components of the depth-related images of the plurality of viewpoints.

(16)

The image processing apparatus according to (14) or (15), in which the 3D model generation unit includes:

a convex hull generation unit that generates a convex hull on the basis of camera parameters for the plurality of viewpoints; and a correction unit that generates the 3D model of the foreground by correcting the convex hull generated by the convex hull generation unit, on the basis of the foreground depth images of the plurality of viewpoints.

(17)

An image processing method implemented by an image processing apparatus, the image processing method including a 3D model generation step of generating a 3D model of a foreground, on the basis of foreground depth images of a plurality of viewpoints.

REFERENCE SIGNS LIST

13 Decoding apparatus
31 Reception unit
33 Reconstruction unit
101 Visual hull generation unit
102 Correction unit
151 to 154 Silhouette image
191 to 194 Depth image
203 Visual Hull
221 Silhouette image generation unit
241 Convex hull generation unit
260 Convex Hull
261 Foreground depth image generation unit
263 Mesh superimposing unit
281 Silhouette image
282 Depth image
301 to 305 Foreground depth image
344 Polygon mesh

The invention claimed is:

1. An image processing apparatus, comprising:
a processor configured to:
control reception of depth-related images of a plurality of viewpoints, wherein
the depth-related images comprise depth images as luminance components of the depth-related images and foreground images as color components of the depth-related images, and
the foreground images are silhouette images corresponding to silhouettes of a foreground; and
generate a three-dimensional (3D) model of the foreground based on the depth images as the luminance components of the depth-related images of the plurality of viewpoints and the foreground images as the color components of the depth-related images of the plurality of viewpoints.

2. The image processing apparatus according to claim 1, wherein the processor is further configured to generate the foreground images for respective viewpoints based on a threshold for a pixel value of the foreground in the depth images, and the depth images.

3. The image processing apparatus according to claim 2, wherein the processor is further configured to control reception of the depth images of the plurality of viewpoints and the threshold.

4. The image processing apparatus according to claim 1, wherein the processor is further configured to:
generate a visual hull based on the foreground images of the plurality of viewpoints;
correct the visual hull based on the depth images of the plurality of viewpoints; and
generate the 3D model of the foreground based on the correction of the visual hull.

5. The image processing apparatus according to claim 1, wherein the processor is further configured to:
generate foreground depth images for respective viewpoints based on the depth images and the foreground images; and generate the 3D model of the foreground based on the foreground depth images.

6. An image processing method, comprising
in an image processing apparatus:
   receiving depth-related images of a plurality of viewpoints, wherein
      the depth-related images comprise depth images as luminance components of the depth-related images and foreground images as color components of the depth-related images, and
      the foreground images are silhouette images corresponding to silhouettes of a foreground; and
   generating a three-dimensional (3D) model of the foreground based on the depth images as the luminance components of the depth-related images of the plurality of viewpoints and the foreground images as the color components of the depth-related images of the plurality of viewpoints.

7. An image processing apparatus, comprising:
a processor configured to control transmission of depth-related images of a plurality of viewpoints and foreground information about a foreground of the plurality of viewpoints for generation of a three-dimensional (3D) model of the foreground, wherein
   the depth-related images comprise depth images as luminance components of the depth-related images and foreground images as color components of the depth-related images, and
   the foreground images are silhouette images corresponding to silhouettes of the foreground.

8. The image processing apparatus according to claim 7, wherein the foreground information is a threshold for a pixel value of the foreground in the depth images.

9. An image processing method, comprising:
in an image processing apparatus:
   transmitting depth-related images of a plurality of viewpoints and foreground information about a foreground of the plurality of viewpoints for generation of a three-dimensional (3D) model of the foreground, wherein
      the depth-related images comprise depth images as luminance components of the depth-related images and foreground images as color components of the depth-related images, and
      the foreground images are silhouette images corresponding to silhouettes of the foreground.

10. An image processing apparatus, comprising:
a processor configured to:
   control reception of depth-related images of a plurality of viewpoints, wherein
      the depth-related images comprise foreground depth images as luminance components of the depth-related images and background depth images as color components of the depth-related images;
      the foreground depth images are based on depth images and foreground images of the plurality of viewpoints, and
      the foreground images are silhouette images corresponding to silhouettes of a foreground; and
   generate a three-dimensional (3D) model of the foreground based on the foreground depth images as the luminance components of the depth-related images of the plurality of viewpoints.

11. The image processing apparatus according to claim 10, wherein the processor is further configured to:
   generate a convex hull based on camera parameters for the plurality of viewpoints;
   correct the convex hull based on the foreground depth images of the plurality of viewpoints; and
   generate the 3D model of the foreground by based on the correction of the convex hull.

12. An image processing method, comprising:
in an image processing apparatus:
   receiving depth-related images of a plurality of viewpoints, wherein
      the depth-related images comprise foreground depth images as luminance components of the depth-related images and background depth images as color components of the depth-related images,
      the foreground depth images are based on depth images and foreground images of the plurality of viewpoints, and
      the foreground images are silhouette images corresponding to silhouettes of a foreground; and
   generating a three-dimensional (3D) model of the foreground based on the foreground depth images as the luminance components of the depth-related images of the plurality of viewpoints.

\* \* \* \* \*